(12) United States Patent
Knight et al.

(10) Patent No.: US 8,475,966 B2
(45) Date of Patent: Jul. 2, 2013

(54) APPARATUS AND METHOD OF RECOVERING VAPORS

(75) Inventors: James William Knight, Gibsonton, FL (US); Donald Edward Haynes, Jr., Tampa, FL (US)

(73) Assignee: IES Consulting, Inc., Tampe, FL (US)

( * ) Notice: Subject to any disclaimer, the term of this patent is extended or adjusted under 35 U.S.C. 154(b) by 407 days.

(21) Appl. No.: 12/804,725

(22) Filed: Jul. 27, 2010

(65) Prior Publication Data
US 2011/0300464 A1  Dec. 8, 2011

Related U.S. Application Data

(63) Continuation-in-part of application No. 10/948,480, filed on Sep. 23, 2004, now Pat. No. 7,762,082.

(60) Provisional application No. 60/505,938, filed on Sep. 25, 2003.

(51) Int. Cl.
*H01M 8/04*  (2006.01)

(52) U.S. Cl.
USPC ........... 429/444; 429/436; 429/443; 429/505; 429/515

(58) Field of Classification Search
None
See application file for complete search history.

(56) References Cited

U.S. PATENT DOCUMENTS

| | | |
|---|---|---|
| 2,947,379 A | 8/1960 | Aubrey |
| 3,714,790 A | 2/1973 | Battey |
| 3,894,942 A | 7/1975 | Mair |
| 4,098,303 A | 7/1978 | Gammell |
| 4,380,146 A | 4/1983 | Yannone et al. |
| 4,745,868 A | 5/1988 | Seabury |
| 4,957,049 A | 9/1990 | Strohmeyer, Jr. |
| 4,988,580 A * | 1/1991 | Ohsaki et al. ................. 429/411 |
| 5,343,902 A * | 9/1994 | Ramioulle ....................... 141/7 |
| 5,426,945 A | 6/1995 | Menzenski |
| 5,584,911 A | 12/1996 | Menzenski |
| 5,666,825 A | 9/1997 | Darredeau et al. |
| 5,958,138 A | 9/1999 | Tomita et al. |
| 6,066,898 A | 5/2000 | Jensen |
| 6,141,628 A | 10/2000 | Worth et al. |
| 6,170,251 B1 | 1/2001 | Skowronski et al. |
| 6,393,821 B1 | 5/2002 | Prabhu |
| 6,408,895 B1 | 6/2002 | Beam |
| 6,460,350 B2 | 10/2002 | Johnson et al. |
| 7,762,082 B1 | 7/2010 | Knight et al. |
| 2006/0137245 A1* | 6/2006 | Kenefake et al. ................. 48/61 |
| 2007/0042237 A1 | 2/2007 | Sorkin et al. |
| 2008/0206608 A1* | 8/2008 | Lienkamp et al. .............. 429/13 |

* cited by examiner

*Primary Examiner* — Jonathan Crepeau
(74) *Attorney, Agent, or Firm* — Frijouf, Rust & Pyle P.A.

(57) ABSTRACT

An apparatus and method is disclosed for recovering a flammable vapor emanating from a vent of a tank. The apparatus comprises an input conduit for connecting to the vent of the tank. An input manifold connects the input conduit to an input of a compressor with an output manifold connecting an output of the compressor to an input of a storage tank. An output conduit connects an output of the storage tank to the turbine generator for generating electrical power by processing the flammable vapor. An electrical connector directs electrical power from the turbine generator to drive the apparatus as well as to supply surplus power to an external load.

15 Claims, 16 Drawing Sheets

APPARATUS AND METHOD OF RECOVERING VAPORS

CROSS-REFERENCE TO RELATED APPLICATIONS

This is a continuation-in-part of U.S. patent application Ser. No. 10/948,480 filed Sep. 23, 2004 now U.S. Pat. No. 7,762,802. U.S. patent application Ser. No. 10/948,480 filed Sep. 23, 2004 claims benefit to U.S. Patent Provisional application No. 60/505,938 filed Sep. 25, 2003. All subject matter set forth in application Ser. No. 10/948,480 and provisional application No. 60/505,938 is hereby incorporated by reference into the present application as if fully set forth herein.

BACKGROUND OF THE INVENTION

1. Field of the Invention

This invention relates to vapor recovery and more particularly to an apparatus and a process of recovering flammable vapor emissions venting from a source such as a tank.

2. Description of the Related Art

In recent decades, public has become more aware of the hazards and ramifications of pollutants entering the atmosphere. These atmospheric pollutants range from simple, naturally occurring gases and/or vapors such as carbon dioxide to man made gases and/or vapors containing complex hydrocarbons. In an effort to control the amount of undesirable gases and/or vapors from entering the atmosphere, many countries have implemented laws to reduce and/or contain these undesirable gases and/or vapors from entering the atmosphere. Various solutions have been proposed by the prior art in an effort to eliminate or reduce the amount of undesirable gases and/or vapors from entering the atmosphere. These various solutions have been dependant on the types and quantity of the undesirable gases and/or vapors.

Some in the prior art have proposed the recovery and the recycling of the undesirable gases and/or vapors. Unfortunately, the devices proposed by the prior art for the recovery and the recycling of the undesirable gases and/or vapors are not economically feasible for the recovery of small quantities of undesirable gases and/or vapors. Accordingly, the prior art has merely "burned off" the small quantities of undesirable gases and/or vapors in an open flame. The open flame burning of the undesirable gases and/or vapors generates carbon dioxide and possibly other pollutants that enter the atmosphere during the burning process.

One specific example of the emission of small quantities of undesirable gases and/or vapors occurs during the refilling of a tank with a flammable liquid. As the tank is refilled with the flammable liquid, the residual vapors within the tank are displaced during the refilling process. Although the residual vapors could be recovered by a conventional recovery system, the cost of the conventional recovery system required to recover these vapors far exceeds the benefit of the recovery process. The following prior art references are examples of the attempts of the prior art to provide an economic system for recovering undesirable gases and/or vapors emitted into the atmosphere.

U.S. Pat. No. 4,380,146 to R. A. Yannone et al. discloses a gas turbine power plant including an industrial gas turbine that drives a rotating brushless exciter generator coupled to a power system through a breaker. One or more of the turbine-generator plants are operated by a hybrid digital computer control system during sequenced startup, synchronizing, load, and shutdown operations. The program system for the computer and external analog circuitry operate in a multiple gas turbine control loop arrangement. Logic macro instructions are employed in programming the computer for logic operations of the control system.

U.S. Pat. No. 4,745,868 to S. W. Seabury discloses a system for and method of producing a beneficiated fuel from a raw low ranked moisture ladened fuel. A combustion turbine is operated to provide a flow of exhaust gas out of an exhaust outlet at a temperature above ambient. The flow of exhaust gas is then directed across the raw low ranked moisture ladened fuel such that a portion of the moisture carried by the raw fuel is removed to produce the beneficiated fuel.

U.S. Pat. No. 4,957,049 to C. Strohmeyer, Jr. discloses an invention comprising an organic waste fuel combustion and tempering gas flow control system integrated with a gas turbine combined cycle steam generating plant. The gas turbine exhaust, wherein the oxygen content is partially consumed is used to dry and support combustion of an organic fuel high in moisture content after said fuel has been dewatered and pelletized. A portion of the gas turbine exhaust gas stream dries the pelletized waste fuel while a parallel portion of the gas turbine hot gas stream is used to support combustion and furnish oxygen in the ignition zone of the pelletized waste combustor. The drying stream also tempers secondary combustion gas temperature. The two gas streams are combined downstream of the combustion zone. The regenerated combined stream is then utilized in a steam generating section to generate steam. The gas turbine exhaust flow provides the mass flow and heat required for drying and combusting the pelletized waste fuel and the heat input from the pellet firing system regenerates the gas turbine exhaust gas stream. The pellet combustion process is maintained at temperature levels that avoid formation of deleterious products of combustion during the incineration process.

U.S. Pat. No. 5,666,825 to B. Darredeau et al. discloses a process and installation for the separation of air in a cryogenic distillation apparatus comprising a distillation column and in which the supplied air is separated to produce a fraction rich in oxygen and a fraction rich in nitrogen as products. The purities of these products are maintained substantially constant during variations of demand of either product or of the flow rate or of the pressure of the supplied air by introducing an excess of liquid rich in nitrogen into the distillation apparatus when the demand for the product or the flow rate of the supplied air increases, and by withdrawing an excess of liquid rich in nitrogen from the distillation apparatus, and storing this liquid, when the demand for the product or the flow rate of the supplied air decreases. The apparatus comprises a medium pressure column and a low pressure column and a reflux conduit which permits a reflux liquid to be withdrawn from the medium pressure column and to be injected into the low pressure column.

U.S. Pat. No. 6,066,898 to D. Jensen discloses a micro turbine power generating system including a combustor and a gas compressor that provides a flow of natural gas to a combustor. The flow of natural gas is regulated by varying the speed of the gas compressor for maintaining the gas compressor discharge pressure at a set point. The system further includes a turbine and an electrical generator that is driven by the turbine during a run mode of operation. A rectifier and a main inverter convert an output of the electrical generator into fixed frequency ac power during the run mode. A secondary inverter operates an electric motor of the gas compressor at the variables speeds during the run mode. During a startup mode, however, the main inverter operates the gas compressor motor, and the secondary inverter operates the electrical generator as a starter motor.

U.S. Pat. No. 6,141,628 to S. J. Worth et al. discloses a computer-implemented method and a computer-readable program for designing software applications for execution in a programmable logic controller including determining whether a physical input is analog or discrete, and responsive to the physical input being analog, inputting a set of analog parameters, and responsive to the physical input being discrete, inputting a set of discrete parameters, and storing the parameters in a user parameter data table. The method includes executing a programmable logic controller application responsive to a set of user-defined parameters, including reading an input, and determining whether the input is in fault, and, responsive to the input being in fault, performing an operation from a group of operations consisting of an alarm and a shutdown.

U.S. Pat. No. 6,170,251 to M. J. Skowronski et al. discloses a micro turbine power generating system including a primary compressor, an electrical generator and a turbine that can be rotated as a unit. Hot, expanding gases resulting from combustion are expanded through the turbine, and the resulting turbine power is used for powering the electrical generator. The micro turbine power generating system further includes an auxiliary compressor that is driven by the turbine power. During operation of the system, a small portion of air can be bled off the primary compressor and further compressed in the auxiliary compressor to provide an auxiliary supply of pressurized air. The heat of high-pressure compression is recovered to increase the overall efficiency of the machine.

U.S. Pat. No. 6,393,821 to E. Prabhu discloses a building structure enclosing a gaseous mixture of air and a combustible fuel. Air is obtained from the atmosphere, and the gaseous fuel is obtained from natural evolution and diffusion processes associated with rotting of materials, as from landfills, and gaseous digestion products from livestock, etc. A process control system is engaged for drawing off the gaseous mixture, at a selected air-fuel ratio, from the structure. The selected gaseous mixture is drawn from the building, through a compressor and then a pre-heater, into a catalytic combustor where the mixture is burned and directed into a turbine for producing work. This work is preferably converted into electricity by a generator driven by the turbine. A process controller senses process variables such as temperature, pressure, latent heat of fusion, etc. so as to assure that combustion cannot occur prematurely, but does occur most efficiently in the catalytic combustor. Process heat is exchanged for pre-heating the mixture to be burned.

In our prior invention set forth in application Ser. No. 10/948,480 filed Sep. 23, 2004 now U.S. Pat. No. 7,762,802, we disclosed an improved apparatus for recovering a flammable vapor emanating from a vent of a tank.

It is an object of the present invention to expand upon our prior invention to provide an apparatus for recovering a flammable vapor emanating from a vapor source.

Another object of this invention is to provide an improved apparatus for recovering a flammable vapor emanating from a vapor source capable of generating electricity through a fuel cell.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description setting forth the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an apparatus for recovering a hydrocarbon vapor emanating from a source, comprising an input conduit having an input coupling for connecting to the source. A compressor has a compressor input and a compressor output for compressing the hydrocarbon vapor. An input manifold interconnects the input conduit to the compressor input. An output manifold connects to the compressor output. A fuel cell is provided for generating electrical power by processing the hydrocarbon vapor. An output conduit interconnects the output manifold to the fuel cell for providing hydrocarbon vapor to fuel the fuel cell. An electrical connector directs electrical power from the fuel cell to drive the compressor.

An apparatus for recovering a hydrocarbon vapor emanating from a vent of a tank during the filling of the tank with a liquid comprising an input conduit having an input coupling for connecting to the vent of the tank for receiving hydrocarbon vapor emanating from a vent. A compressor has a compressor input and a compressor output. A storage tank has a storage tank input and a storage tank output. An input manifold interconnects the input conduit to the compressor input for enabling the compressor to compress the hydrocarbon vapor. A fuel cell is provided for generating electrical power. A first output conduit interconnects the compressor output to the fuel cell for enabling the fuel cell to generate electrical power upon processing of the hydrocarbon vapor. A second output conduit interconnects the compressor output to the storage tank input for storing compressed hydrocarbon vapor from the compressor output. An electrical connector directs electrical power from the fuel cell to power the compressor.

The invention is also incorporated into the method of recovering a hydrocarbon vapor emanating from a vent of a tank during the filling of the tank with a liquid, comprising the steps of connecting an input conduit to the vent of the tank for receiving hydrocarbon vapor emanating from the vent of the tank. The hydrocarbon vapor emanating from the vent of the tank is compressed into a compressed hydrocarbon vapor. The compressed hydrocarbon vapor is directed to a fuel cell for generating electrical power upon processing of the compressed hydrocarbon vapor. Electrical power from the fuel cell is directed to power the compressor of the hydrocarbon vapor emanating from the vent of the tank.

In a more specific embodiment of the invention, the invention comprises an apparatus for recovering a hydrocarbon vapor emanating from vents of a plurality of tanks comprising a plurality of input conduits for connecting to the vents of the plurality of tanks. A plurality of compressors with each compressor has a compressor input and a compressor output for compressing the hydrocarbon vapor. A storage tank has a storage tank input and a storage tank output. An input manifold including a plurality of input manifold valves interconnects the plurality of input conduits to the plurality of compressor inputs. An output manifold including a plurality of output manifold valves is connected to the plurality of compressor outputs. A fuel cell is provided for generating electrical power by processing hydrocarbon vapor. A first output conduit interconnects the compressor output to the fuel cell. A second output conduit interconnects the compressor output to the storage tank input. An electrical connector directs electrical power from the fuel cell to drive the compressor. A control is provided for controlling the plurality of input manifold valves and the plurality of output manifold valves for providing a compressed vapor to power the fuel cell and for storing excess compressed vapor in the storage tank for subsequent use by the fuel cell.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
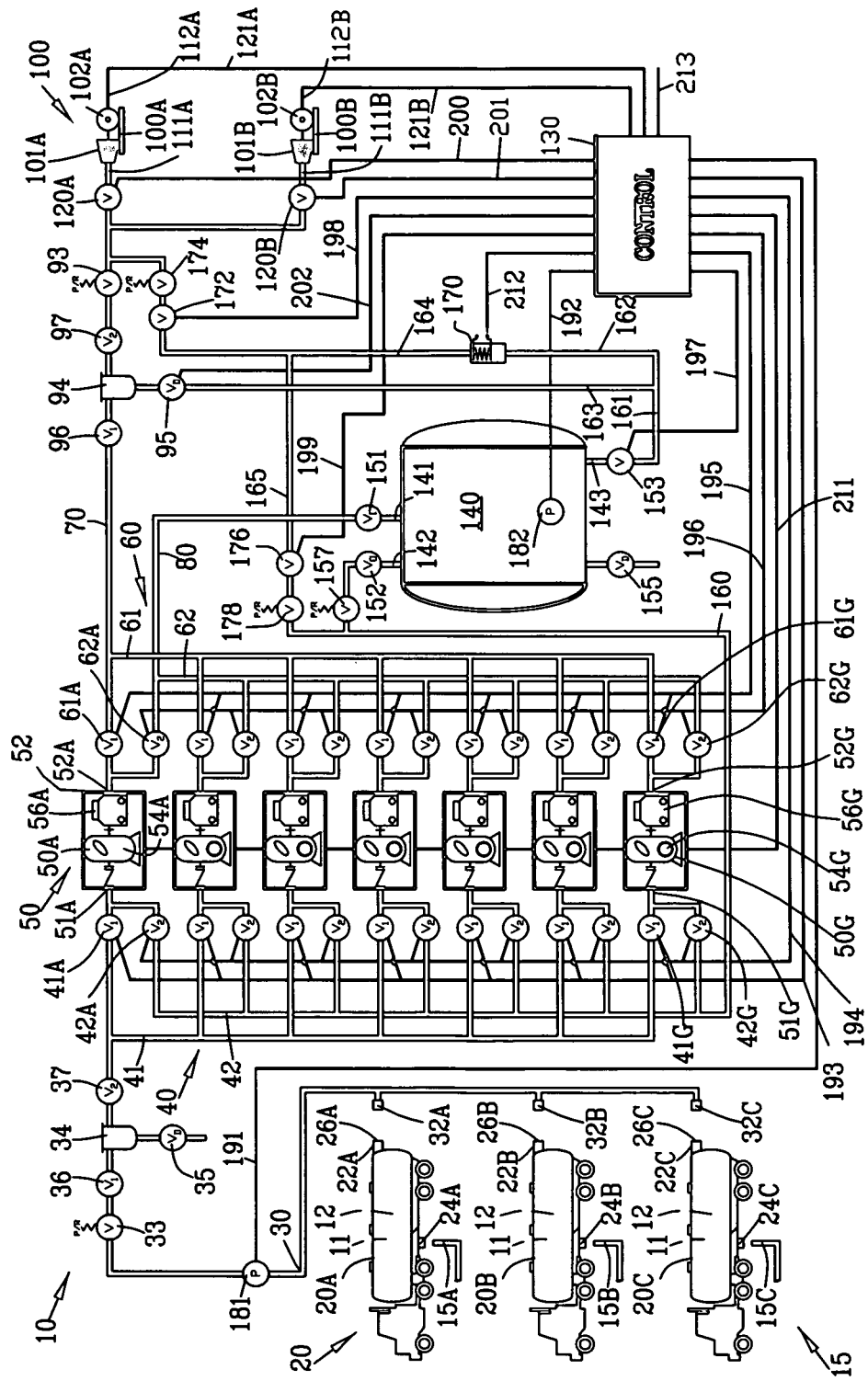
FIG. 1 is schematic diagram of an apparatus for recovering vapors associated with flammable fuel emanating from a tank.

FIG. 1 is a schematic diagram of an apparatus 10 for recovering a flammable vapor 11 associated with flammable liquid fuel 12 from a filling line 15. The flammable vapor 11 emanates from a tank 20 upon filling of the tank 20 with flammable liquid fuel 12 from the filling lines 15.

In this example of the invention, the filling lines 15 are shown as plural filling lines 15A-15C for filling plural tanks 20A-20C. The plural tanks 20A-20C are shown as plural mobile truck tankers 20A-20C for carrying liquefied flammable fuel or petroleum products such as gasoline, diesel fuel, fuel oils, kerosene, jet fuel, naptha, alcohols or the like. Although the tank 20 is shown as a truck tanker, it should be appreciated by those skilled in the art that the tanks 20 may be representative of tank located on other types of mobile or static tanks such as railroad tanks, sea vessel tanks, aircraft tanks and the like.

The plural tanks 20A-20C include plural vents 22A-22C located at upper portions of the plural tanks 20A-20C and plural filling apertures 24A-24C are located at a lower portion of the plural tanks 20A-20C. The filling lines 15A-15C are affixable to the plural filling apertures 24A-24C during the filling of the plural tanks 20A-20C with the volatile flammable liquid fuel 12. Preferably, the plural filling lines 15A-15C are self-sealing upon disconnection from the plural filling apertures 24A-24C.

The plural tanks 20A-20C are representative of tanks previously filed with a volatile flammable liquid fuel 12. When the volatile flammable liquid fuel 12 is removed from the plural tanks 20A-20C, vapors 11 of the volatile flammable liquid fuel 12 still remain in the empty tanks 20A-20C. As the empty plural tanks 20A-20C are refilled with the volatile liquid product 12, the vapors 11 in the empty plural tanks 20A-20C are displaced by the volatile liquid product 12 entering into the plural tanks 20A and 20B. The vapors 11 displaced by the volatile liquid product 12 entering into the plural tanks 20A-20C exit from the plural vents 22A-22C.

The apparatus 10 comprises an input conduit 30 having plural input couplings 32A-32C for connecting to the plural vents 22A-22C of the plural tanks 20A-20C. Preferably, the input couplings 32A-32C are self-sealing upon disconnection from the plural vents 22A-22C. The input couplings 32A-32C receive flammable vapor 11 emanating from plural vents 22A-22C of the plural tanks 20A-20C as the volatile liquid product 12 is filled into the plural tanks 20A-20C. Although plural tanks 20A-20C are shown, preferably, the input conduit 30 includes a greater number of input couplings for simultaneously receiving flammable vapor 11 from greater number of tanks.

In this example, the input conduit 30 includes a safety pressure relief valve 33 for venting extreme vapor pressure 11 from the input conduit 30. An input desiccant dryer 34 is interposed within the input conduit 30. The input desiccant dryer 34 includes a drain valve 35.

Preferably, the input desiccant dryer 34 is interposed between first and second input valves 36 and 37. The first and second input valves 36 and 37 isolate the input desiccant dryer 34 from the remainder of the apparatus 10 for draining the input desiccant dryer 34 through the drain valve 35. The drain valve 35 removes water vapor and/or condensation from the vapor 11 emanating from the plural tanks 20A and 20B.

The apparatus includes an input manifold 40 comprising a first and a second input manifold 41 and 42. The input conduit 30 is connected to the first input manifold 41 for directing the product vapor 11 to a compressor 50. An output manifold 60 comprises a first and a second output manifold 61 and 62. The first and second output manifolds 61 and 62 are connected to an output 52 of the compressor 50.

The first input manifold 41 includes a plurality of first input manifold valves 41A-41G whereas the second input manifold 42 includes a plurality of second input manifold valves 42A-42G. The first output manifold 61 includes a plurality of first output manifold valves 61A-61G whereas the output manifold 60 includes a second plurality of second output manifold valves 62A-62G.

The compressor 50 comprises a plurality of compressors 50A-50G having compressor inputs 51A-51G and compressor outputs 52A-52G. The plurality of compressors 50A-50G are driven individually by a plurality of electric motors 54A-54G. The compressed vapors discharged from the plurality of compressors 50A-50G are cooled by coolers 56A-56G. A typical example of the compressor 50 is the Copeland Scroll Gas Compressor, Model SZN22C2A manufactured by the Copeland Corporation.

The plurality of first input manifold valves 41A-41G and the plurality of second input manifold valves 42A-42G of the first and second input manifolds 41 and 42 are connected to the compressor inputs 51A-51G of the compressor 50. The plurality of first input manifold valves 41A-41G of the first input manifold 41 are connected to the input conduit 30.

The plurality of first output manifold valves 61A-61G and the plurality of second output manifold valves 62A-62G of the first and second output manifolds 61 and 62 are connected to the compressor outputs 52A-52G of the compressor 50. The plurality of first output manifold valves 61A-61G of the first output manifold 61 are connected to a first output conduit 70. The plurality of second output manifold valves 62A-62G of the second output manifold 62 are connected to a second output conduit 80.

The first output conduit 70 includes a pressure-regulating valve 93 for passing vapors only above a preselected pressure level and for blocking vapors below the preselected pressure level. The pressure-regulating valve 93 insures that only vapors above the preselected pressure level pass from the output conduit 70. An output desiccant dryer 94 is interposed within the output conduit 70. The output desiccant dryer 94 includes a drain valve 95.

Preferably, the output desiccant dryer 94 is interposed between a first and a second output valve 96 and 97. The first and second output valves 96 and 97 isolate the output desiccant dryer 94 from the remainder of the apparatus 10 for draining the output desiccant dryer 94 through the drain valve 95. The drain valve 95 removes condensed liquid from the compressed vapor 11.

The first output conduit 70 is connected to a micro turbine electrical generator 100. In this example, the micro turbine electrical generator 100 comprises a first and a second micro turbine electrical generator 100A and 100B. Although the micro turbine electrical generator 100 has been shown as first and second micro turbine electrical generators 100A and 100B, it should be appreciated by those skilled in the art that the micro turbine electrical generator 100 may be a single unit or many multiple units.

The first micro turbine electrical generator 100A comprises a first micro turbine 101A and a first electrical generator 102A. The first micro turbine electrical generator 100A includes a first micro turbine input 111A for receiving compressed vapor 11 for powering the first micro turbine 101A. A first micro turbine input valve 120A controls the flow of the compressed vapors 11 to the first micro turbine input 111A. The first micro turbine 101A rotates the first electrical generator 102A for generating electrical power from a first electrical generator output 112A. The first electrical generator output 112A is connected through a first output connector 121A to a control 130. A typical example of the first and second micro turbine electrical generators 100A and 100B is the Capstone C30 Microturbine manufactured by the Capstone Turbine Corporation of Chatsworth, Calif.

In a similar manner, the second micro turbine electrical generator 100B comprises a second micro turbine 101B and a second electrical generator 102B. The second micro turbine electrical generator 100B includes a second micro turbine input 111B for receiving compressed vapor 11 for powering the second micro turbine 101B. A second micro turbine input valve 120B controls the flow of the compressed vapors 11 to the second micro turbine input 111B. The second micro turbine 101B rotates the second electrical generator 102B for generating electrical power from a second electrical generator output 112B. The second electrical generator output 112B is connected through a second output connector 121B to the control 130.

The pressure-regulating valve 93 is set for passing only vapors above a preselected pressure level sufficient for proper operation of the first and second micro turbines 101A and 101B. In one example, the pressure-regulating valve 93 is set for a vapor pressure level of 80 pounds per square inch for proper operation of the first and second micro turbines 101A and 101B.

The plurality of second output manifold valves 62A-62G of the second output manifold 62 are connected through the second output conduit 80 to a storage tank 140. The storage tank 140 includes a storage tank input 141, a storage tank vapor output 142 and a storage tank liquid output 143. A storage tank input valve 151 is connected to the storage tank input 141 whereas a storage tank output valves 152 and 153 are connected to the storage tank vapor output 142 and the storage tank liquid output 143, respectively. The storage tank 140 includes a drain valve 155 for draining a liquid from the storage tank 140.

The storage tank output valve 152 connects the storage tank vapor output 142 through a pressure-regulating valve 157 and a recycling conduit 160 to the second input manifold 42. The plurality of second input manifold valves 42A-42G of the second input manifold 42 are connected to the compressor inputs 51A-51G of the compressor 50.

The pressure-regulating valve 157 passes vapors only above a preselected pressure level and block vapors below the preselected pressure level. The pressure-regulating valve 157 is set for passing only vapors above a preselected pressure level sufficient for proper operation of the compressors 50A-50G. In this example, the pressure-regulating valve 157 is set for a vapor pressure level of 30 pounds per square inch for proper operation of the compressors 50A-50G.

A conduit 161 extends from the storage tank output valve 153 connected to the storage tank liquid output 143. The conduit 161 is connected through a conduit 162 an electric vaporizer 170. The conduit 161 is connected through a conduit 163 to the drain valve 95 extending from the output desiccant dryer 94. A conduit 164 connects the electric vaporizer 170 through a valve 172 and a pressure-regulating valve 174 to the first output conduit 70.

The pressure-regulating valve 174 is similar to pressure-regulating valve 93. The pressure-regulating valve 174 passes vapors only above a preselected pressure level and block vapors below the preselected pressure level. The pressure-regulating valve 174 is set for passing only vapors above a preselected pressure level sufficient for proper operation of the first and second micro turbines 101A and 101B. In this example, the pressure-regulating valve 174 is set for a vapor pressure level of 80 pounds per square inch for proper operation of the first and second micro turbines 101A and 101B.

A conduit 165 connects the conduit 164 through a valve 176 and a pressure-regulating valve 178 to the recycling conduit 160. The pressure-regulating valve 178 is similar to pressure-regulating valve 157. The pressure-regulating valve 178 passes vapors only above a preselected pressure level and block vapors below the preselected pressure level. The pressure-regulating valve 178 is set for passing only vapors above a preselected pressure level sufficient for proper operation of the compressors 50A-50G. In this example, the pressure-regulating valve 178 is set for a vapor pressure level of 30 pounds per square inch for proper operation of the compressors 50A-50G.

A first pressure sensor 181 is interposed within the input conduit 30 for sensing the pressure of the vapor 11 within the input conduit 30. A second pressure sensor 182 is located within the storage tank 140 for sensing the pressure of the vapor 11 within the storage tank 140. Electrical connectors 191 and 192 connect the first and second pressure sensors 181 and 182 to the control 130.

The electrical connectors 193 individually connect each of the plurality of first input manifold valves 41A-41G to the control 130 whereas electrical connectors 194 individually connect each of the plurality of second input manifold valves 42A-42G to the control 130. Similarly, the electrical connectors 195 individually connect each of the plurality of first output manifold valves 61A-61G to the control 130 whereas electrical connectors 196 individually connect each of the plurality of second output manifold valves 62A-62G to the control 130. The electrical connectors 197-199 individually connect each of the valves 153, 172, 176, to the control 130 and the electrical connectors 200 and 201 individually connect each of the valves 120A and 120B to the control 130. The electrical connector 200 connects the valve 95 to the control 130.

The electrical output connectors 121A and 121B from the first and second electrical generator outputs 112A and 112B are connected through the control 130 and electrical connectors 211 to power individually the electric motors 54A-54B of the plurality of compressors 50A-50G. Furthermore, the electrical output connectors 121A and 121B are connected through the control 130 and electrical connectors 212 to power the vaporizer 170. An output conductor 213 is connected to the control 130 for exporting electricity from the micro turbine electrical generator 100A and 100B.

The apparatus 10 is capable of functioning in various modes of operation as shown in FIGS. 2-6. The apparatus 10 as presented in this example is designed such that each of the compressors 50A-50G is capable of compressing vapor emanating from one of the tanks 20A-20C. The compressed vapor output from each of the compressors 50A-50G is capable of powering one of the micro turbine electrical generator 100A and 100B. Although the apparatus 10 as presented in this example in this specific configuration, it should be understood that numerous other specific configuration may be used in the practice of the present invention.

FIG. 1 illustrates the apparatus 10 in a non-operating condition. The plural tanks 20A-20C are located in proximity to the input couplings 32A-32C. The plural tanks 20A-20C are waiting to be connected to the input couplings 32A-32C.

Figure 2:
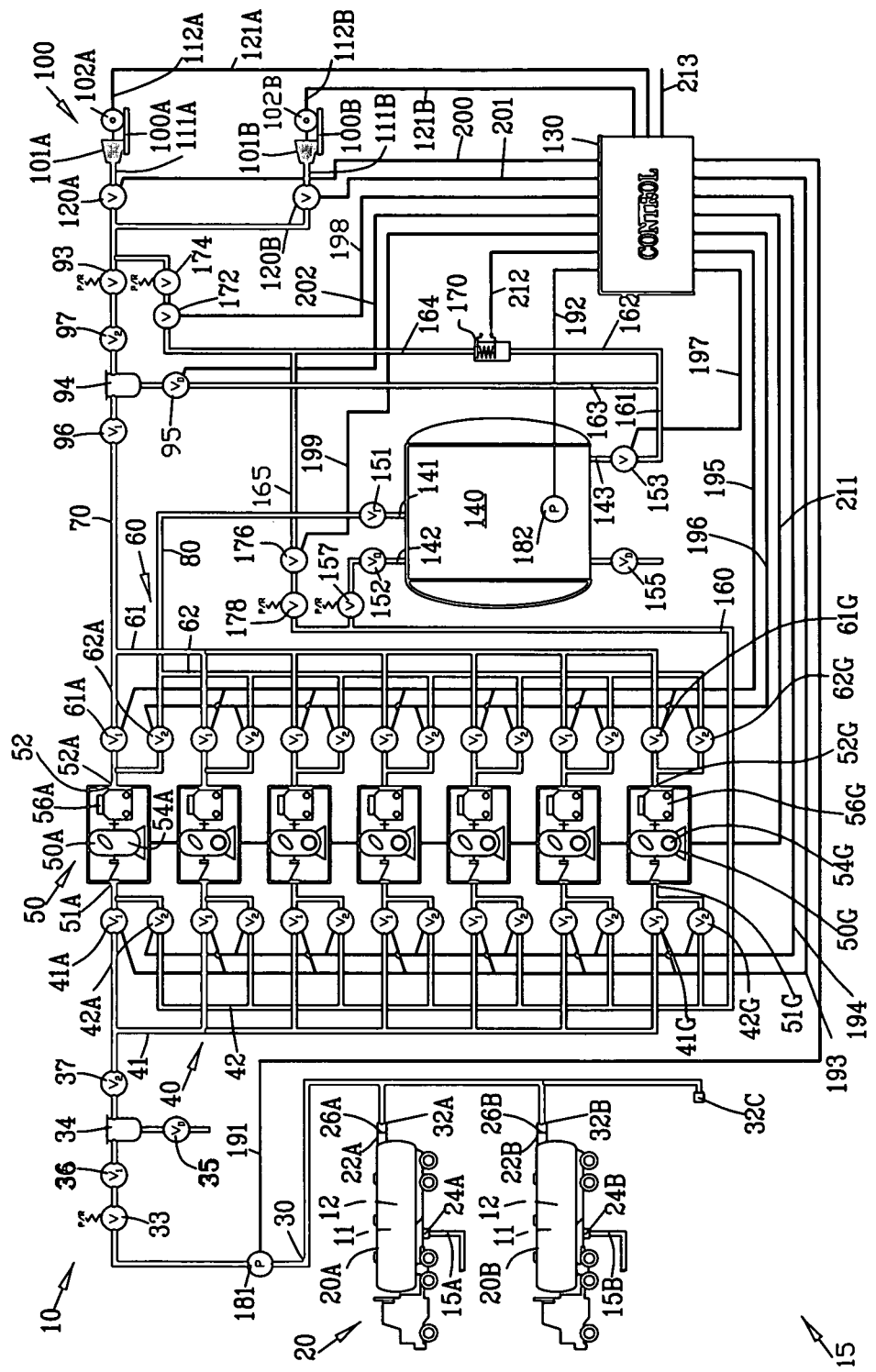
FIG. 2 is a schematic diagram of the apparatus of FIG. 1 illustrating a first mode of operation with vapor emanating from two tanks.

FIG. 2 illustrates the apparatus 10 in a first operating in condition. The tanks 20A and 20B. are located in proximity to the input coupling was 32A-32B. The input couplings 32A and 32B are connected to the tank vents 22A and 22B. The filling lines 15A and 15B are connected to the tank filling apertures 24A and 24B.

A flammable liquid is introduced into the tanks 20A and 20B through the filling apertures 24A and 24B in a conventional matter. As the flammable liquid enters the tanks 20A and 20B, vapors from the tanks 20A and 20B passed from the tank vents 22A and 22B through the input coupling 32A and 32B to enter into the input conduit 30. The first pressure sensor 181 senses the rise of the pressure of the vapor in the input conduit 30.

The pressure sensor 181 is connected through the electrical connector 191 to the control 130. When a vapor pressure is sensed in the input conduit 30, the controller 130 opens the first input manifold valves and 41A and 41B to transfer the vapor into the compressors 50A and 50B, respectively. Concomitantly therewith, the controller 130 opens the first output manifold valves 61A and 61B to direct compressed vapors and into the output conduit 70.

The compressed vapors pass through the valve 96, the output desiccant dryer 94 and the valve 97 to be applied to the pressure-regulating valve 93. The control 130 opens the first and second micro turbine input valve 120A and 120B. The compressed vapors having a sufficient pressure to pass through the pressure regulator valve 93 enter the first and second micro turbine electrical generators 100A and 100B. The compressed vapors entering the first and second micro turbine electrical generators 100A and 100B are burned in an efficient manner to generate electric power on first and second output connectors 121A and 121B. The electric power on first and second output connectors 121A and 121B are applied by electrical connector 160 to power the compressors 50A-50G. Any excess electricity is provided to an output load (not shown) from the control 130 on the output conductor 213. The excess electricity provided on output conductor to 213 may be used to power other electrical equipment and/or to be sold to an electrical utility where permitted by law.

Figure 3:
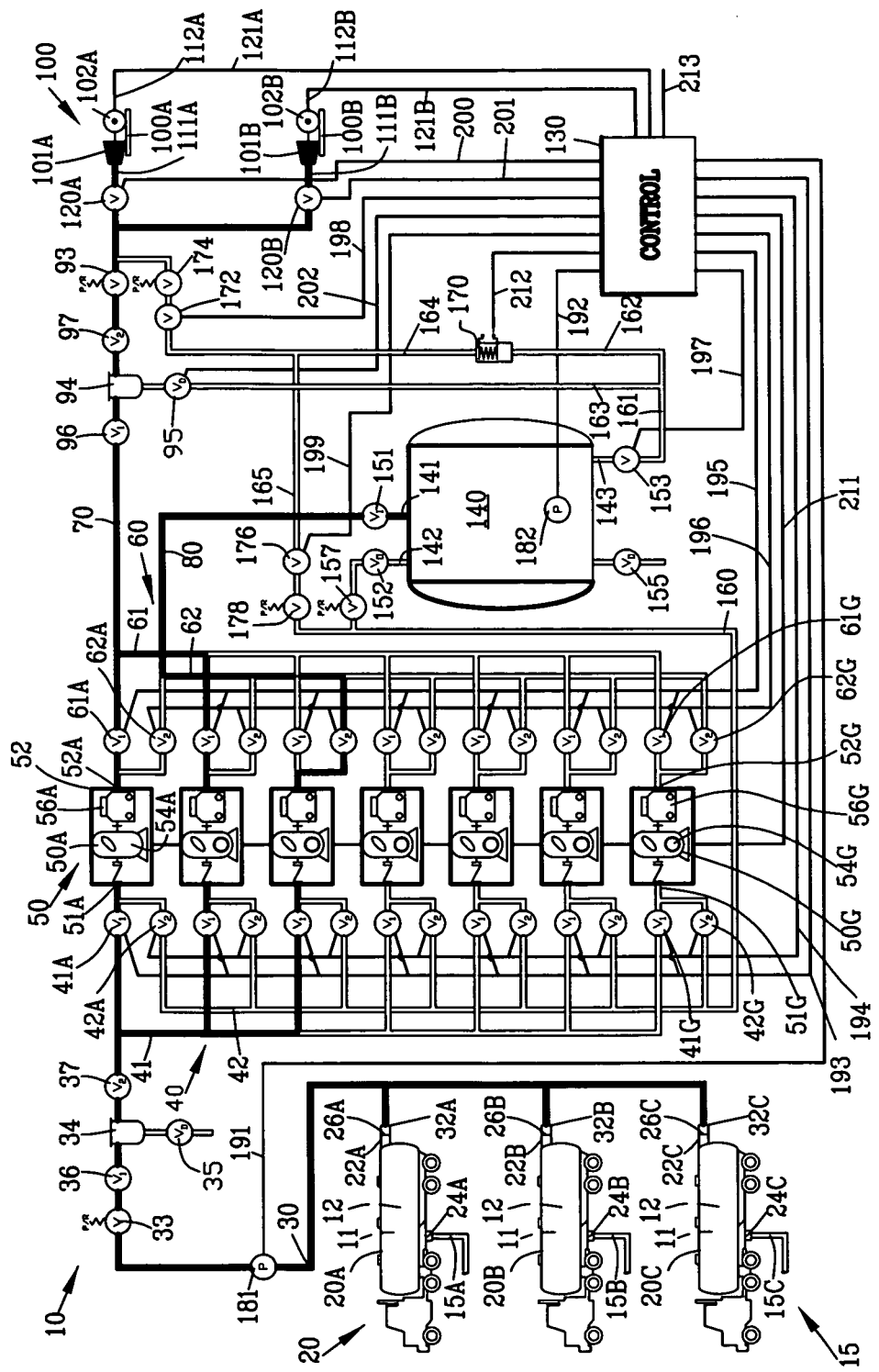
FIG. 3 is a schematic diagram similar to FIG. 2 illustrating the first mode of operation with vapor emanating from three tanks.

FIG. 3 is a view similar to FIG. 2 illustrating three tanks 20A-20C connected to the apparatus 10. In this embodiment, and the vapor emanating from the three tanks 20A-20C is in excess of the amount of vapor required to power the first and second micro turbine electrical generators 100A and 100B. The controller 130 opens the first input manifold valves and 41A-41C to transfer the vapor into the compressors 50A-50C, respectively. The control 130 opens the first output manifold valves 61A and 61B to direct compressed vapors and into the output conduit 70. In addition, the controller 130 opens the second output manifold valves 62C to direct the excess compressed vapors through the output conduit 80 into the storage tank 140.

As previously stated, the apparatus 10 is designed such that each of the compressors 50A-50G is capable of compressing vapor emanating from one of the tanks 20A-20C and the compressed vapor output from each of the compressors 50A-50G is capable of powering one of the micro turbine electrical generator 100A and 100B. For example, in the event that four tanks 20 are connected to the input conduit 30, one-half of the vapor emanating the four tanks is directed through the input and output manifold valves 41A and 41B and 61A and 61B to the first and second micro turbine electrical generators 100A and 100B. The other one-half of the vapor emanating the four tanks is directed through the input and output manifold valves 41C and 41D and 62C and 62D through the output conduit 80 into the storage tank 140.

The pressure sensor 181 senses the amount of the vapor pressure present at the input conduit 30 for enabling the control 130 to select the number of the input manifold valves 41A-41G and 42A-42G and the number of the output manifold valves 61A-61G and 62A-62G for directing the compressed vapor to the first and second micro turbine electrical generator 100A and 100B or to the storage tank 140.

Figure 4:
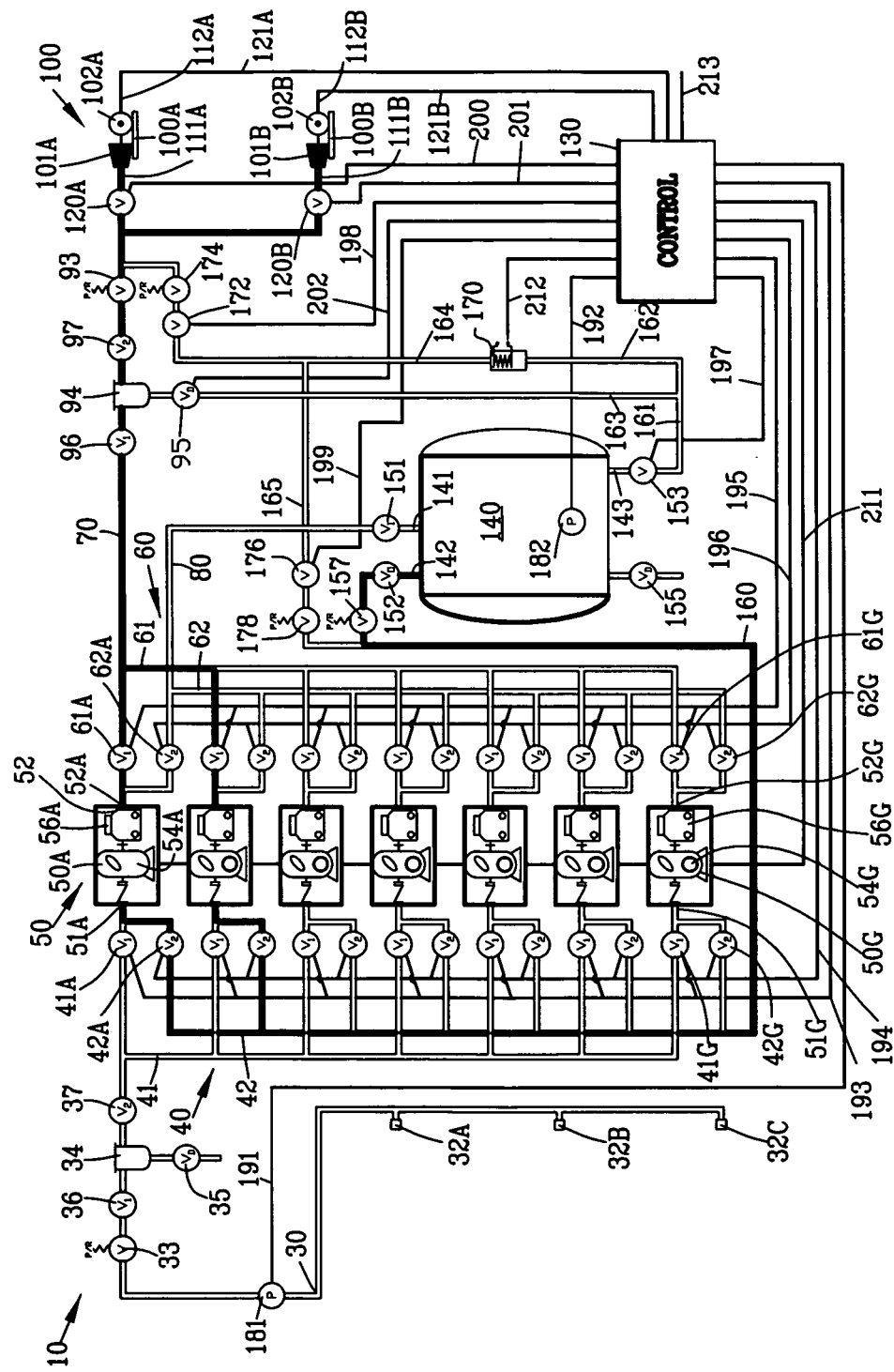
FIG. 4 is a schematic diagram of the apparatus of FIG. 1 illustrating a second mode of operation.

FIG. 4 is a view similar to FIG. 3 illustrating the absence of the tanks 20A-20C. The first pressure sensor 181 senses the absence of a pressure on the input conduit 30. Concomitant therewith, the second pressure sensor 182 senses the pressure of the compressed vapor within the storage tank 140. Upon the absence of pressure in the input conduit 30 along with a preselected pressure within the storage tank 140, the control 130 opens the second input valves 42A and 42B to direct vapors from the storage tank 140 to the compressors 50A and 50B. Concomitantly therewith, the controller 130 opens the first output manifold valves 61A and 61B to direct compressed vapors through the output conduit 70 to the first and second micro turbine electrical generators 100A and 100B. The first and second micro turbine electrical generators 100A and 100B generate electric power on the first and second output connectors 121A and 121B.

Figure 5:
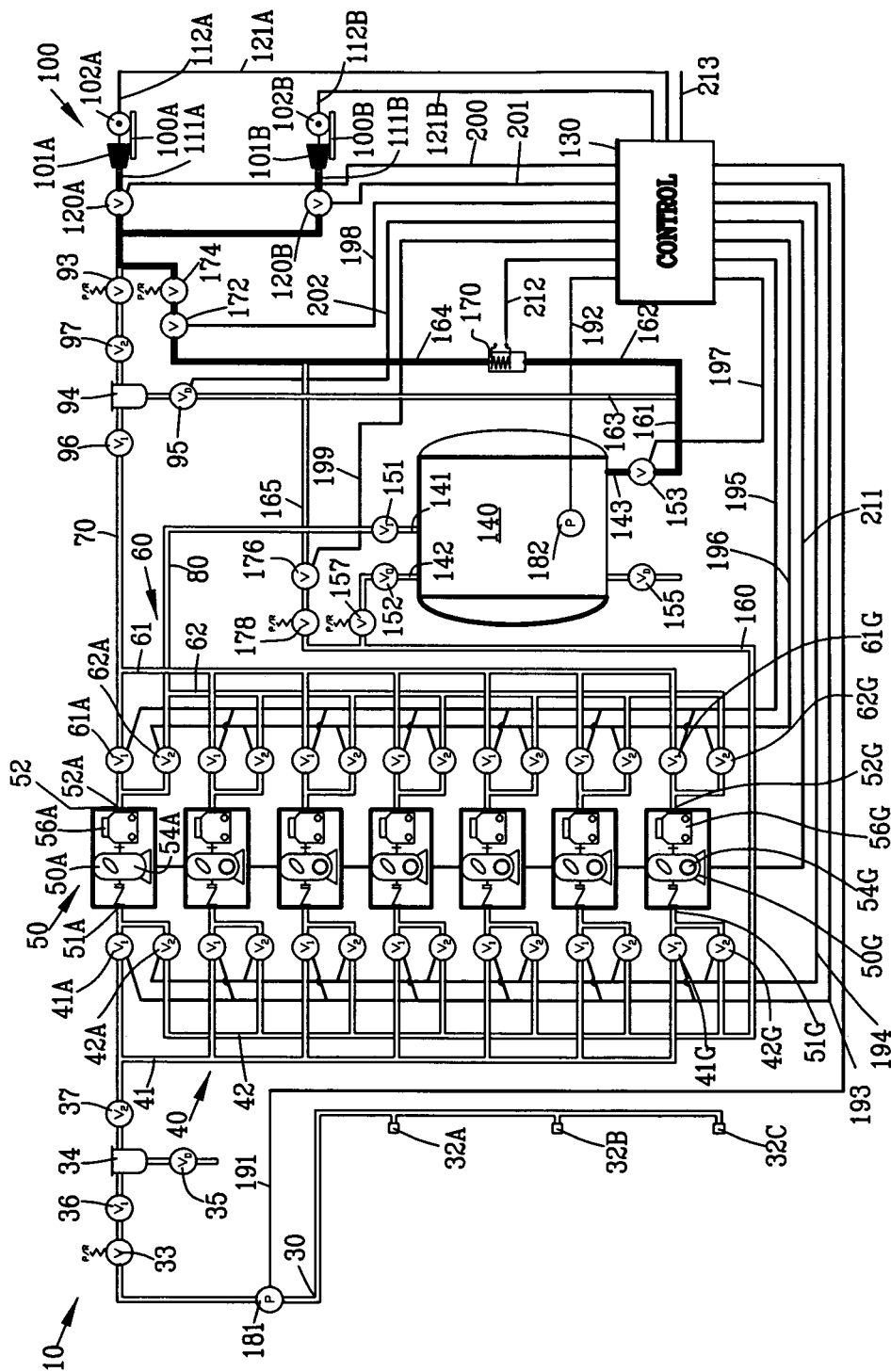
FIG. 5 is a schematic diagram of the apparatus of FIG. 1 illustrating a third mode of operation.

FIG. 5 illustrates a further mode of operation of the apparatus 10. In this example, the condensed vapor within the storage tank 140 provides a flammable liquid. Upon the control 130 opening the liquid output valve 153, the flammable liquid is a directed to the electric evaporator 170. The electrical evaporator 170 is powered by electrical connector 212 through the control 130 from the output connectors 121A and 121B. Upon the opening of the valve 172, the compressed vapors having sufficient pressure pass through the pressure regulator valve 174 and enter the first and second micro turbine electrical generators 100A and 100B. The pressure-regulating valve 174 passes vapors only above a preselected pressure level and blocks vapors below the preselected pressure level. In one example, the pressure-regulating valve 174 is set for a vapor pressure level of 80 pounds per square inch for proper operation of the first and second micro turbines 101A and 101B.

Figure 6:
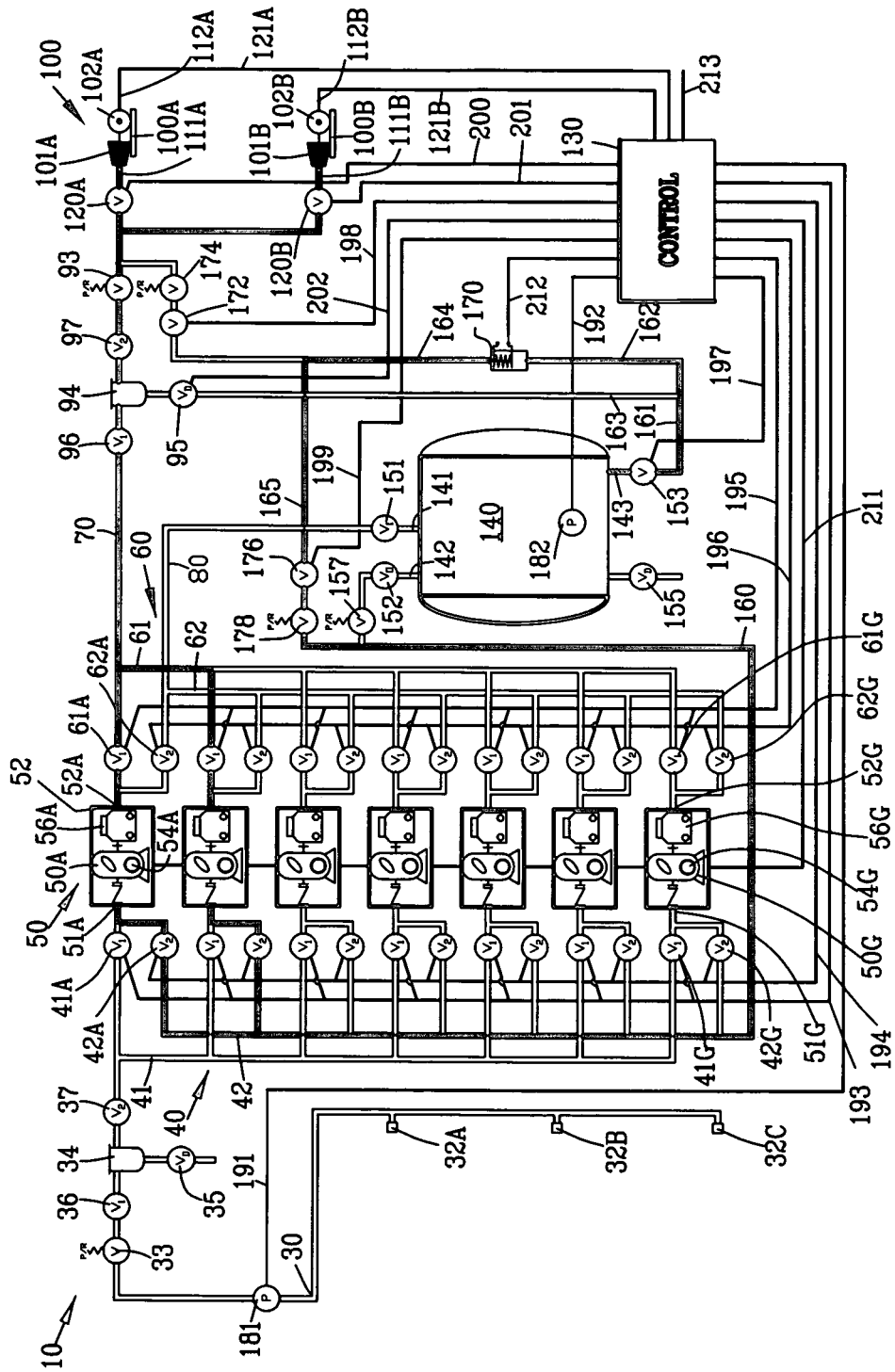
FIG. 6 is a schematic diagram of the apparatus of FIG. 1 illustrating a fourth mode of operation.

FIG. 6 illustrates a further mode of operation of the apparatus 10. Upon the control 130 opening the liquid output valve 153, the flammable liquid is a directed to the electric evaporator 170. Vapor having a pressure insufficient to pass to the pressure-regulating valve 174 passes through conduit 165 to valve 176. Upon the opening of the valve 176, the compressed vapors having insufficient pressure pass through the pressure regulator valve 174 enter the pressure-regulating valve 178. In this example, the pressure-regulating valve 178 is set for a vapor pressure level of 30 pounds per square inch whereas the pressure-regulating valve 174 is set for a vapor pressure level of 80 pounds per square inch.

The vapors having sufficient pressure pass through the pressure regulator valve 178 enter the recycling conduit 160. The vapors pass through the recycling conduit 160 and are applied to the second input to manifold valves 42A and 42B to the compressors 50A and 50B. The output of compressors 50A and 50B are directed by the first manifold output valves 61A and 61B to the output conduit 70 for driving the first and second micro turbine electrical generators 100A and 100B as heretofore described.

Figure 7:
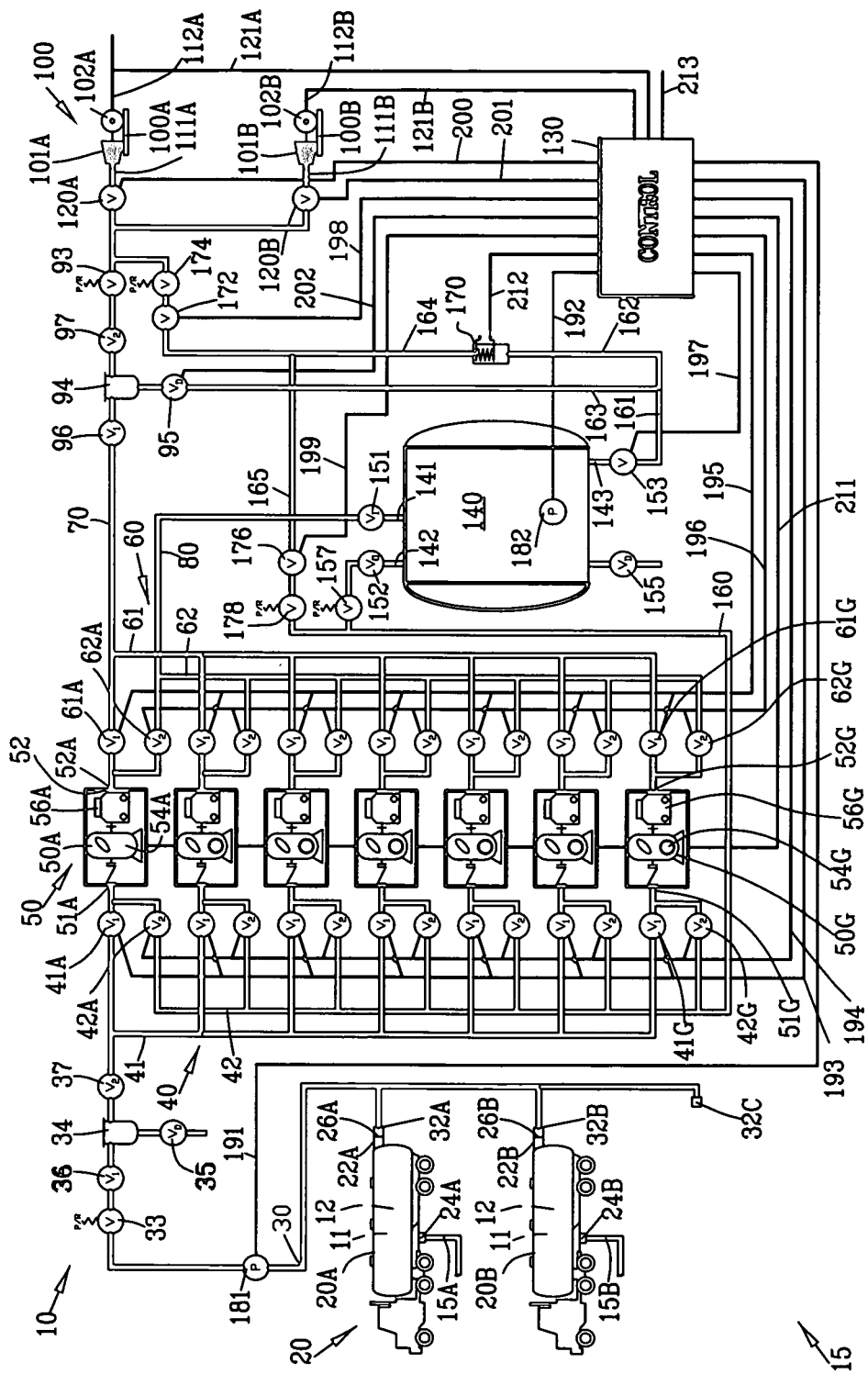
FIG. 7 is a schematic diagram of the apparatus of FIG. 1 illustrating a fifth mode of operation.

FIG. 7 is a schematic diagram of the apparatus 10 of FIG. 2 illustrating a fifth mode of operation. During the operation of the apparatus 10, some of the compressed vapors flowing through the output conduit 70 condense into a liquid. The condensed liquid accumulates within the output desiccant dryer 94.

Upon the control 130 opening the liquid output valve 95, the condensed liquid is a directed to the electric evaporator 170. Upon the opening of the valve 172, the compressed vapors having sufficient pressure pass through the pressure regulator valve 174 and enter the first and second micro turbine electrical generators 100A and 100B. The pressure-regulating valve 174 passes vapors only above a preselected pressure level and blocks vapors below the preselected pressure level.

Figure 8:
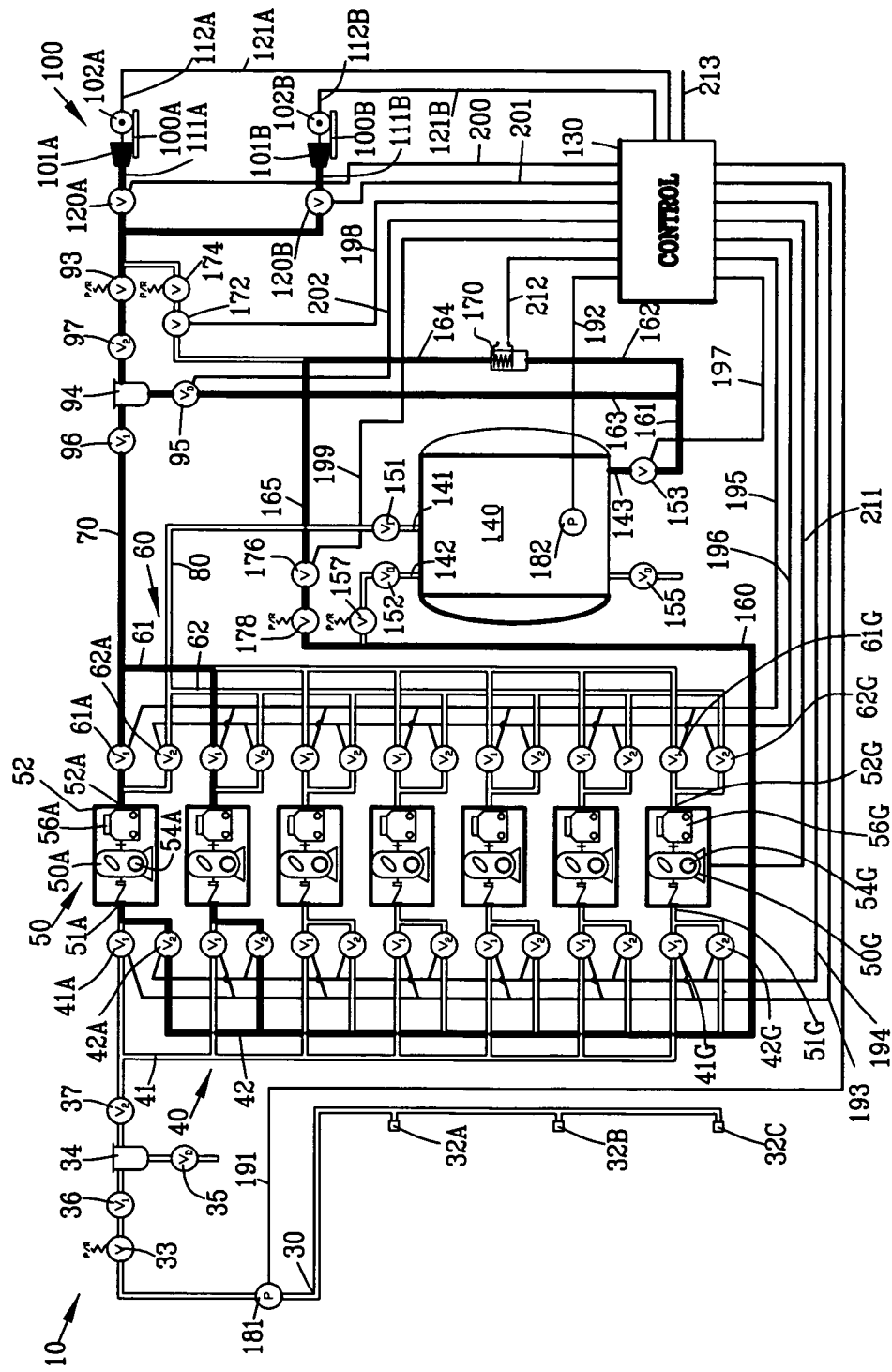
FIG. 8 is a schematic diagram of the apparatus of FIG. 1 illustrating a sixth mode of operation.

FIG. 8 is a schematic diagram of the apparatus 10 of FIG. 1 illustrating a sixth mode of operation. Upon the control 130 opening the liquid output valve 153, the condensed liquid is a directed to the electric evaporator 170. Upon the opening of the valve 176, the compressed vapors having insufficient pressure pass through the pressure regulator valve 174 enter the pressure-regulating valve 178.

The vapors having sufficient pressure pass through the pressure regulator valve 178 enter the recycling conduit 160. The vapors pass through the recycling conduit 160 and are applied to the second input to manifold valves 42A and 42B to the compressors 50A and 50B. The output of compressors 50A and 50B are directed by the first manifold output valves 61A and 61B to the output conduit 70 for driving the first and second micro turbine electrical generators 100A and 100B as heretofore described.

Apparatus 10 of the present invention has several important advantages over the systems of the prior art. The cost of each of the compressors 50A-50G is substantially less than the cost of each of the first and second micro turbine electrical generators 100A and 100B. The apparatus 10 of the present invention achieves an economic advantage by having a greater number of compressors 50A-50G than the number of micro turbine electrical generators 100A and 100B in combination with the storage tank 140.

The use of a greater number of compressors 50A-50G in combination with the input and output manifolds 40 and 60 and the storage tank 140 enables the apparatus 10 to accommodate a greater number of tanks 20 during peak periods of filling of the tanks 20. Thereafter, the compressors 50A-50G in combination with the input and output manifolds 40 and 60 and the storage tank 140 enables the first and second micro turbine electrical generators 100A and 100B to continue operation over a period of time during non-peak periods of filing of the tank 20.

The apparatus 10 receives and stores vapors from a large number of tanks 20 far in excess of the capabilities of the micro turbine electrical generators 100. Thereafter, the apparatus 10 transfers the stored vapors in quantities commensurate with the capabilities of the micro turbine electrical generators 100. The apparatus 10 provides an economical solution for the enabling the apparatus 10 to receive vapors emitted from a large number of tanks 20 during peak periods and to thereafter process the vapors during non-peak periods when tanks 20 are not present at the input conduit 30.

Figure 9:
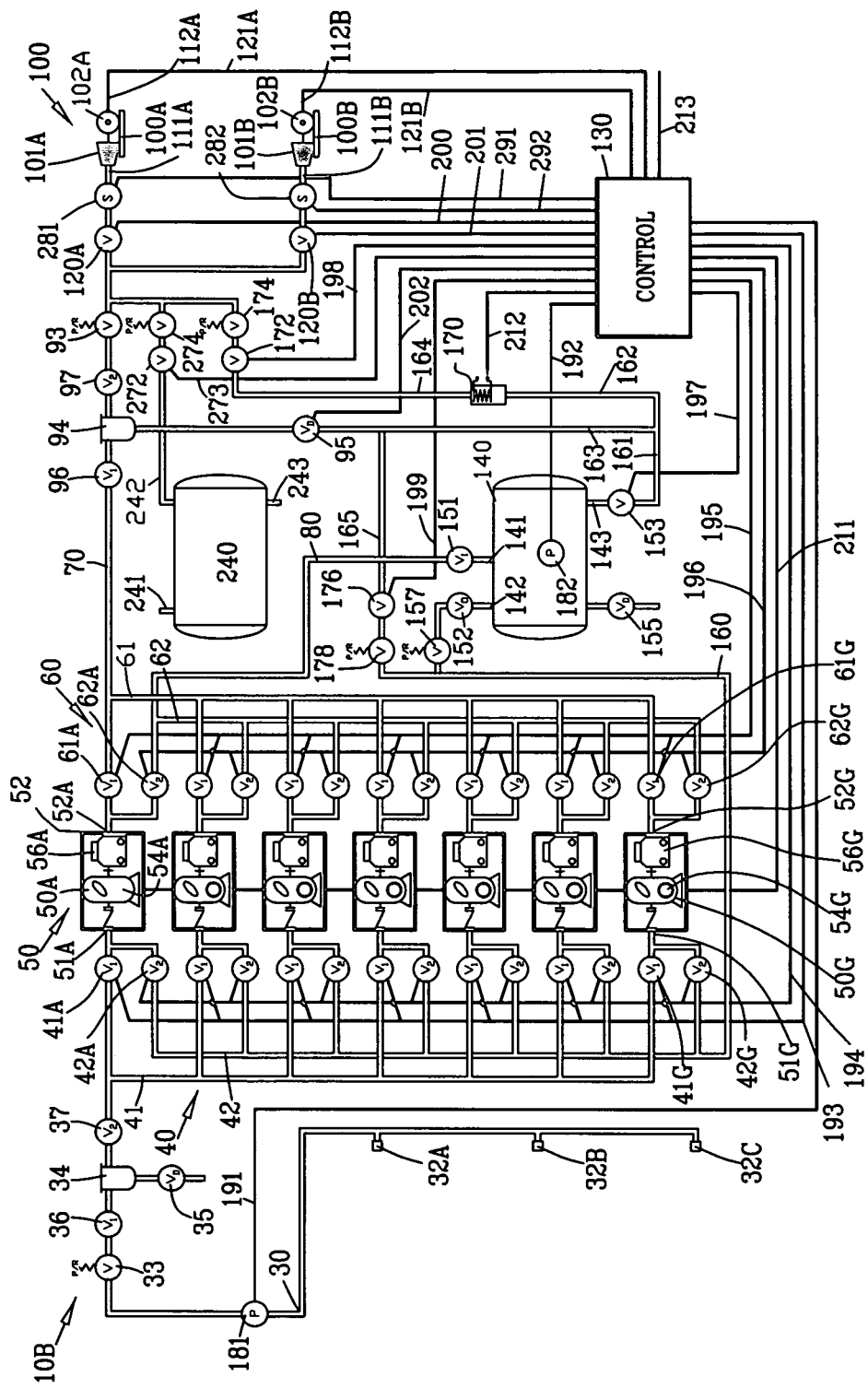
FIG. 9 is schematic diagram of an alternate apparatus for recovering vapors associated with flammable fuel emanating from a tank.

FIG. 9 is schematic diagram of a second embodiment of an apparatus 10B similar to the apparatus 10 shown in FIGS. 1-8. Similar parts of the apparatus 10B are labeled with identical reference numerals as the apparatus 10 shown in FIGS. 1-8.

The second embodiment of the apparatus 10B for recovering vapors 11 associated with flammable fluid 12 emanating from the tank 20 in a manner similar to the apparatus 10 shown in FIGS. 1-8. Furthermore, the apparatus 10B is capable of providing a standby or auxiliary source of electric power.

The apparatus 10B includes a second storage tank 240 having a storage tank input 241 and a storage tank vapor output 242. The storage tank 240 includes a drain valve 255 for draining a liquid from the storage tank 240.

A conduit 261 extends from the storage tank vapor output 242 through a valve 272 and a pressure-regulating valve 274 to the first output conduit 70. The pressure-regulating valve 274 is similar to pressure-regulating valve 174. The pressure-regulating valve 274 passes vapors only above a preselected pressure level and block vapors below the preselected pressure level. The pressure-regulating valve 274 is set for passing only vapors above a preselected pressure level sufficient for proper operation of the first and second micro turbines 101A and 101B. In this example, the pressure-regulating valve 274 is set for a vapor pressure level of 80 pounds per square inch for proper operation of the first and second micro turbine electrical generators 101A and 101B.

A first and a second BTU sensor 281 and 282 are located at the inputs 111A and 112A of the first and second micro turbine 101A and 101B. The first and second BTU sensors 281 and 282 sense the heat content (British Thermal Units) of the vapors entering into the inputs 111A and 112A of the first and second micro turbines 101A and 101B. The outputs of the first and second BTU sensors 281 and 282 are connected through electrical connectors 291 and 292 to the control 130.

FIG. 9 illustrates the apparatus 10B in a non-operating condition. The second storage tank 240 is filled with a conventional fuel such as a liquefied petroleum gas 13 that vaporized at ambient temperature and pressure. The liquefied petroleum gas may be any suitable liquefied petroleum gas 13 such as propane, butane or the like.

Figure 10:
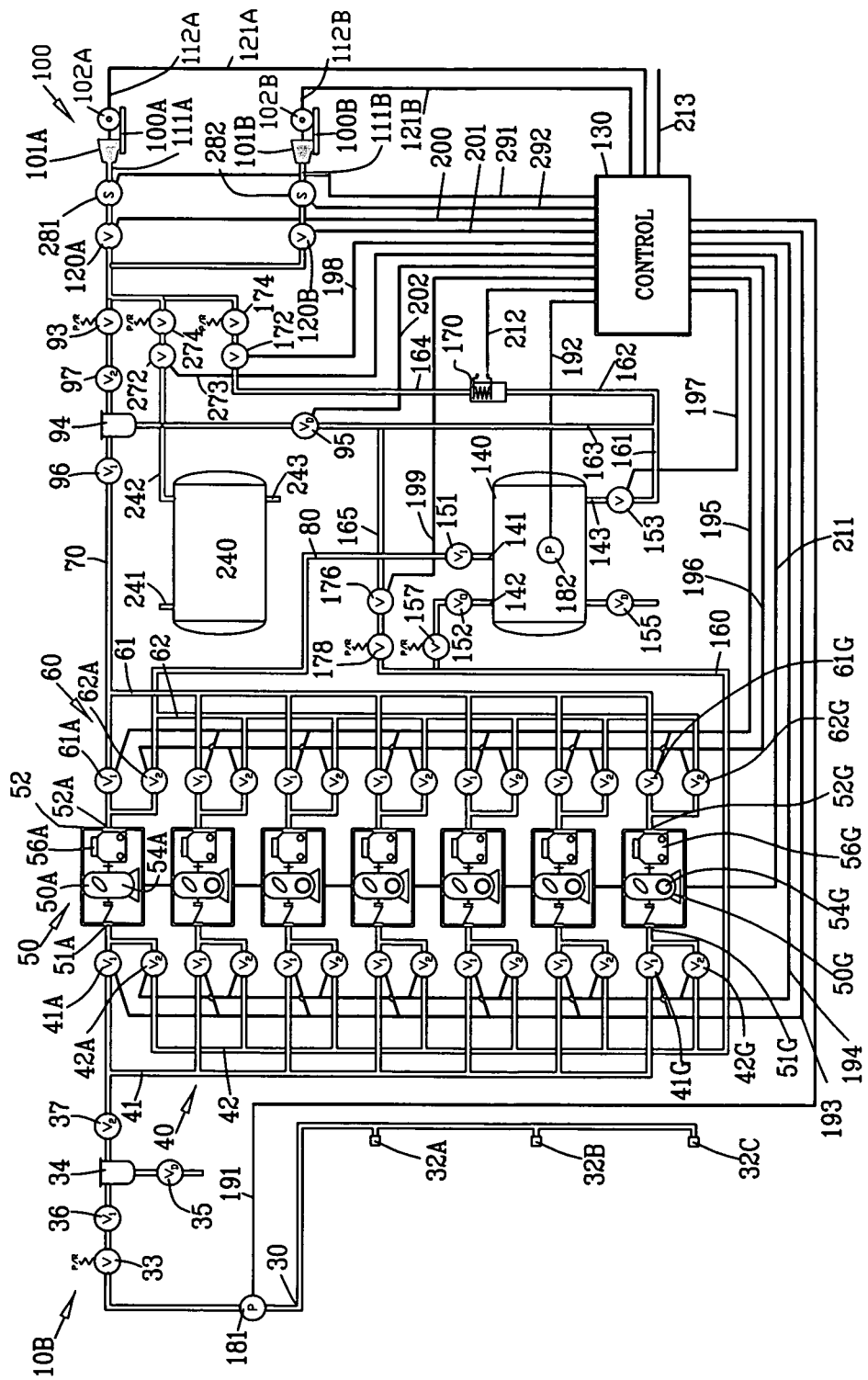
FIG. 10 is a schematic diagram similar to FIG. 9 illustrating a first mode of operation with vapor emanating from a second storage tank operating a first micro turbine electrical generator.

FIG. 10 is a schematic diagram similar to FIG. 9 illustrating a first mode of operation of the first micro turbine electrical generator 100A. Upon an operator input to the control 130, the control 130 opens valves 272 and 120A to direct vapors of the liquefied petroleum gas 13 from the second storage tank 240 to the first micro turbine 101A. In this first mode of operation, the first micro turbine 101A operates solely from the vapor emanating from the liquefied petroleum gas 13. The electrical power generated by the first micro turbine electrical generator 100A is directed from the output conductor 213 by the control 130. The electrical power directed from the output conductor 213 is suitable for use as a standby or an auxiliary source of electric power.

Figure 11:
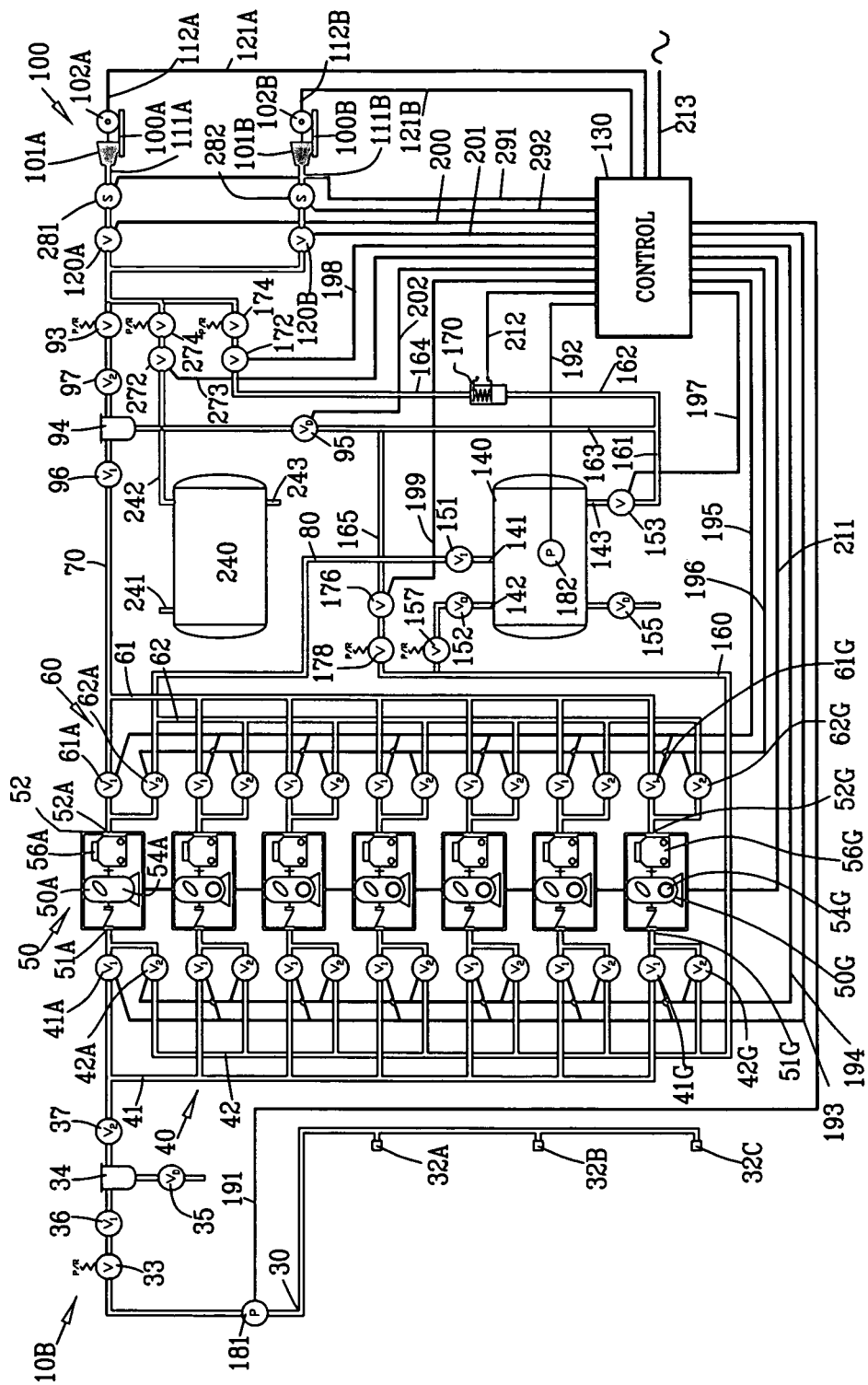
FIG. 11 is a schematic diagram similar to FIG. 9 illustrating a second mode of operation with vapor emanating from the second storage tank operating a first and a second micro turbine electrical generator.

FIG. 11 is a schematic diagram similar to FIG. 9 illustrating a second mode of operation of the first and the second micro turbine electrical generators 100A and 100B. Upon an operator input to the control 130, the control 130 opens valves 272, 120A and 120B to direct vapors of the liquefied petroleum gas 13 from the second storage tank 240 to the first and second micro turbines 101A and 101B. In this second mode of operation, the first and second micro turbines 101A and 101B operate solely from the vapor emanating from the liquefied petroleum gas 13. The electrical power generated by the first and second micro turbine electrical generator 100A and 100B is directed from the output conductor 213 by the control 130. The electrical power directed from the output conductor 213 is suitable for use as a standby or an auxiliary source of electric power.

Figure 12:
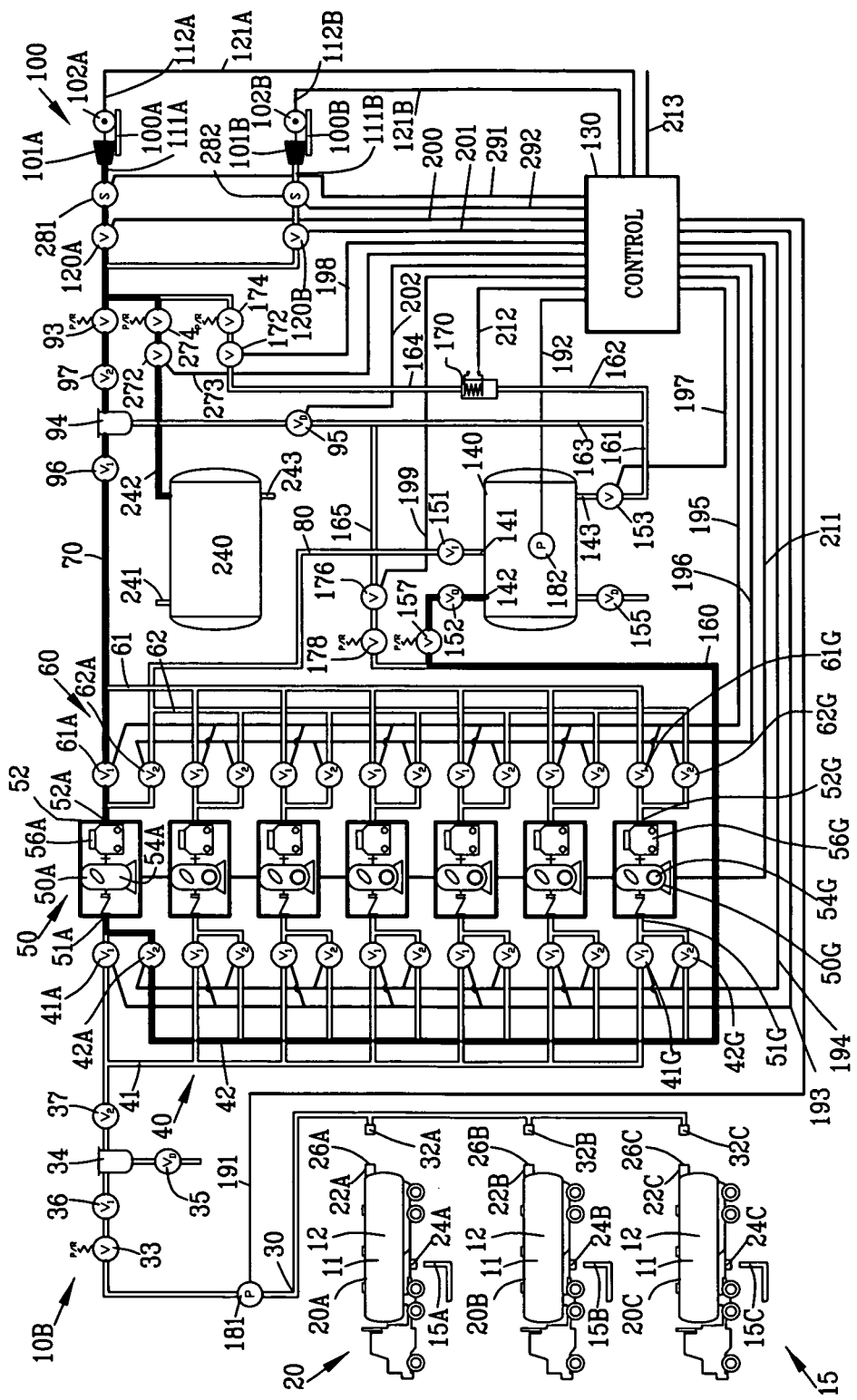
FIG. 12 is a schematic diagram similar to FIG. 9 illustrating a third mode of operation with combined vapors emanating from the second storage tank and a compressor operating the first micro turbine electrical generator.

FIG. 12 is a schematic diagram similar to FIG. 9 illustrating a third mode of operation of the first and second micro turbine electrical generator 100A and 100B. In this example, the third mode of operation is explained with reference to the first micro turbine electrical generator 100A but it should be understood that the third mode of operation may involve either or both of the first and second micro turbines electrical generator 100A and 100B.

The first BTU sensor 281 senses the heat content (British Thermal Units) of the vapors entering into the first micro turbine 101A. Upon the first BTU sensor 281 sensing a flammable vapor 11 from the from the compressor 50 having an insufficient heat content (British Thermal Units) to properly operate the first micro turbines 101A, the first BTU sensor 281 provides a signal to the control 130 on electrical conductor 291. The control 130 opens valves 272 and 120A to direct vapors of the liquefied petroleum gas 13 from the second storage tank 240 to the first micro turbines 101A. The vapors of the liquefied petroleum gas 13 mix with the flammable vapor 11 from the compressor 50 to raise the heat content (British Thermal Units) of the combined vapors entering into the first micro turbine 101A. Preferably, the first BTU sensor 281 and the control 130 work in concert to modulate or intermittently open and close valve 272 to only add the necessary vapors of the liquefied petroleum gas 13 to provide a combination of vapors sufficient to properly operate the first micro turbine 101A.

In a similar manner, the second BTU sensor 282 senses the heat content (British Thermal Units) of the vapors entering into the second micro turbine 102A. Upon the second BTU sensor 282 sensing a flammable vapor 11 having an insufficient heat content (British Thermal Units), the second BTU sensor 282 provides a signal to the control 130 on electrical conductor 292 to open valves 272 and 120B to direct vapors of the liquefied petroleum gas 13 to the second micro turbines 102A. The vapors of the liquefied petroleum gas 13 mix with the flammable vapor 11 from the from the compressor 50 to raise the heat content (British Thermal Units) of the combined vapors entering into the second micro turbine 101B.

Figure 13:
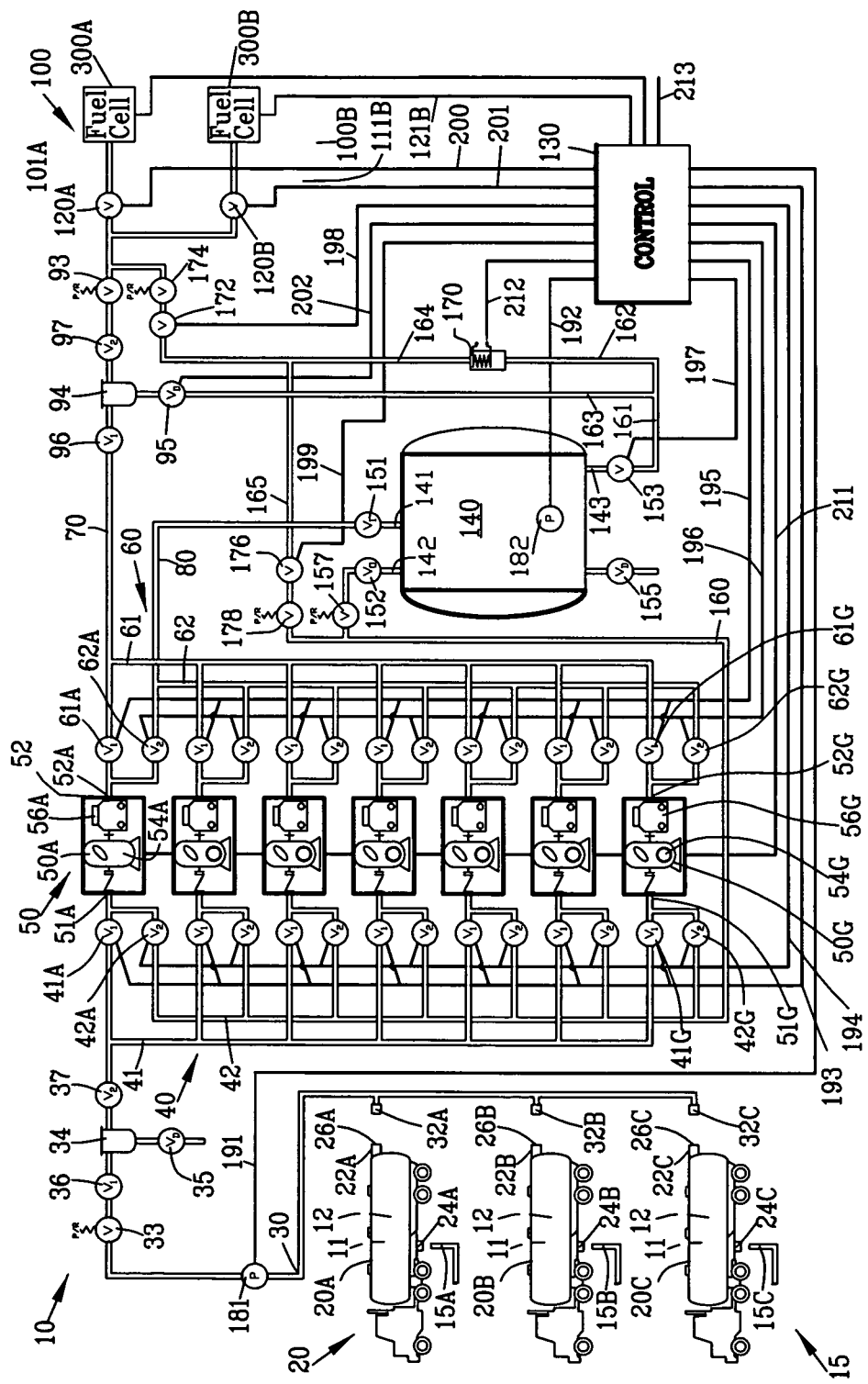
FIG. 13 is a schematic diagram similar to FIG. 1 of an apparatus incorporating a fuel cell for recovering hydrocarbons vapors emanating from a tank.

FIG. 13 is schematic diagram similar to FIG. 1 of an apparatus incorporating a fuel cell 300 in place of the micro turbine electrical generator 100. In this example, the fuel cell 300 comprises a first and a second fuel cell 300A and 300B. Although the fuel cell 300 has been shown as first and a second fuel cell 300A and 300B, it should be appreciated by those skilled in the art that the fuel cell 300 may be a single unit or many multiple units.

A fuel cell 300A input valve 120A controls the flow of the compressed vapors 11 to the input 111A of the first fuel cell 300A. The first fuel cell 300A processes hydrocarbon vapors to generate electrical power from an output 112A. The first electrical generator output 112A is connected through a first output connector 121A to a control 130.

In a similar manner, a second fuel cell input valve 120B controls the flow of the compressed vapors 11 to the input 111B of the second fuel cell 300B. The second fuel cell 300B processes hydrocarbon vapors to generate electrical power from an output 112B. The second electrical generator output 112B is connected through a second output connector 121B to the control 130. The remaining operation the apparatus of FIG. 13 is identical to the operation of the apparatus of FIG. 1.

Figure 14:
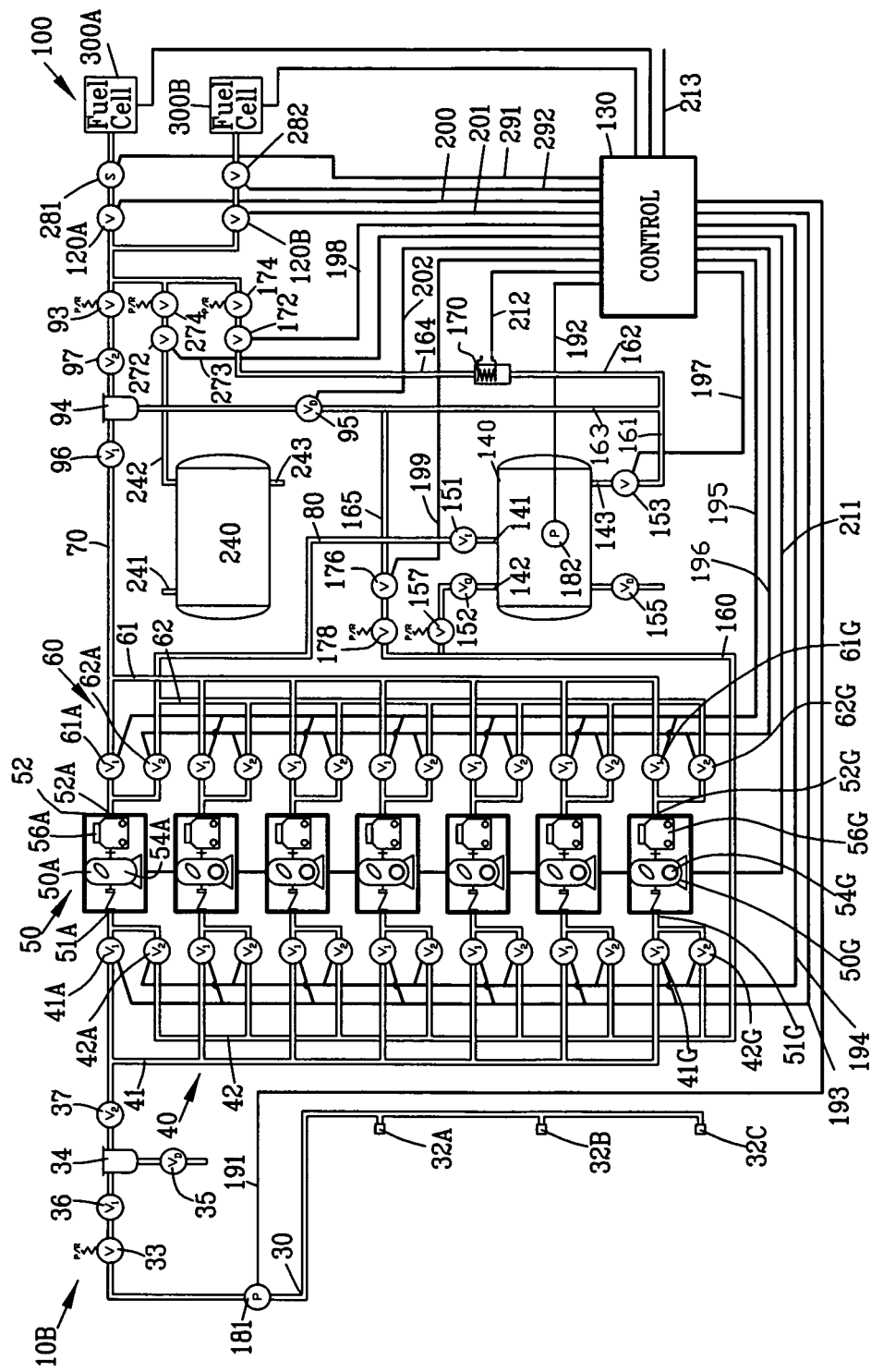
FIG. 14 is a schematic diagram similar to FIG. 9 of an alternate apparatus incorporating a fuel cell for recovering hydrocarbons vapors emanating from a tank.

FIG. 14 is schematic diagram similar to FIG. 9 of an alternate apparatus incorporating a fuel cell 300. In this example, the fuel cell 300 comprises a first and a second fuel cell 300A and 300B. Although the fuel cell 300 has been shown as first and a second fuel cell 300A and 300B, it should be appreciated by those skilled in the art that the fuel cell 300 may be a single unit or many multiple units. The first and second fuel cell 300A and 300B replace the first and second micro turbine electric generators 100A and 100B of FIG. 9. The remaining operation the apparatus of FIG. 14 is identical to the operation of the apparatus of FIG. 9.

Figure 15:
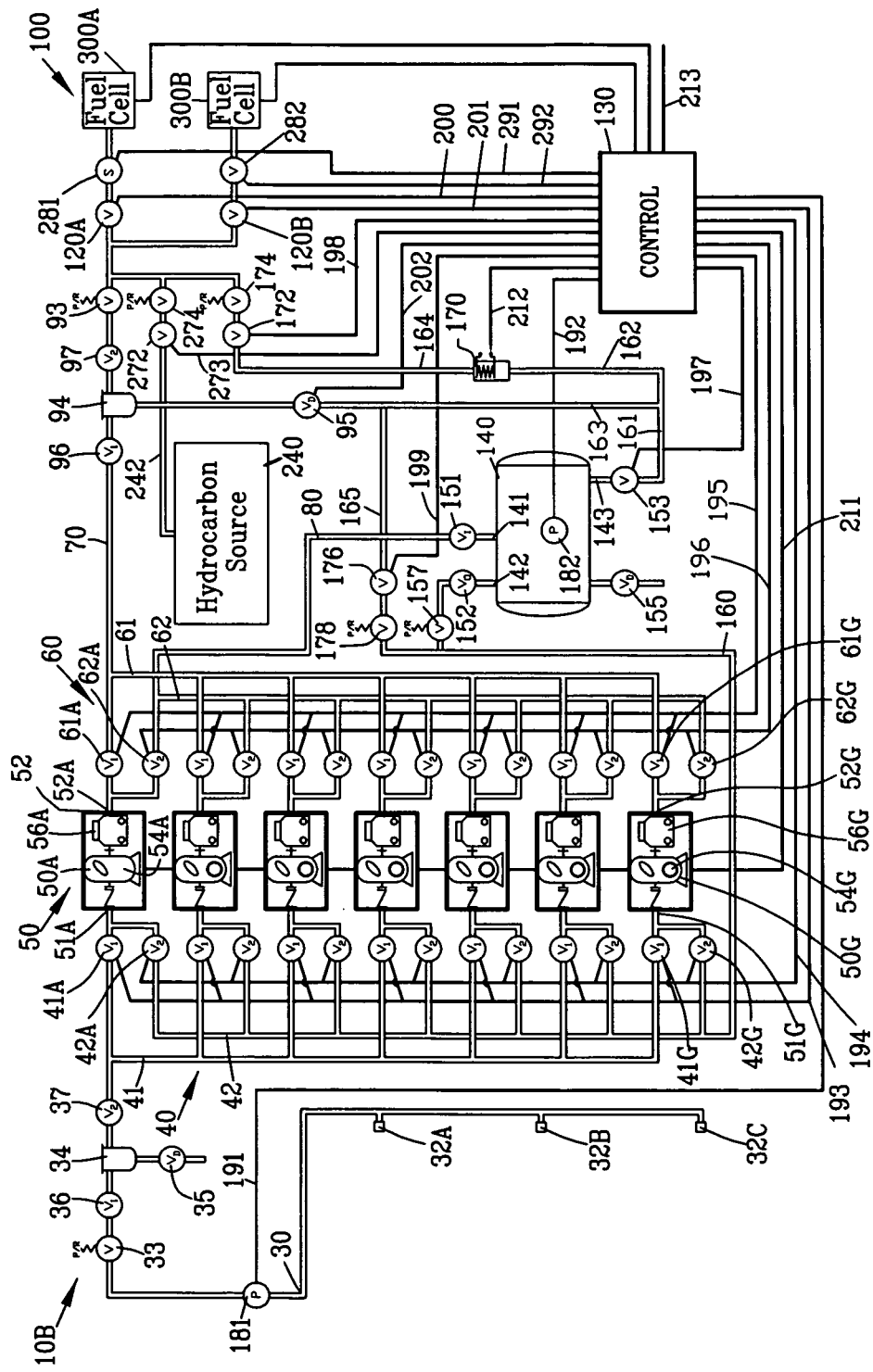
FIG. 15 is a schematic diagram similar to FIG. 13 of an alternate apparatus incorporating a fuel cell for recovering hydrocarbons vapors emanating from a vapor source.

FIG. 15 is schematic diagram similar to FIG. 13 of an alternate apparatus incorporating a fuel cell.

In this example, the fuel cell 300 comprises a first and a second fuel cell 300A and 300B. The first and second fuel cell 300A and 300B replace the first and second micro turbine electric generators 100A and 100B of FIG. 9. Furthermore, a hydrocarbon source 240 provides hydrocarbon vapor to the first and second fuel cells 300A and 300B. It should be appreciated by those skilled in the art that the hydrocarbon source 240 any be any suitable source of hydrocarbon vapor and should not be limited to a vent of a tank as shown.

Figure 16:
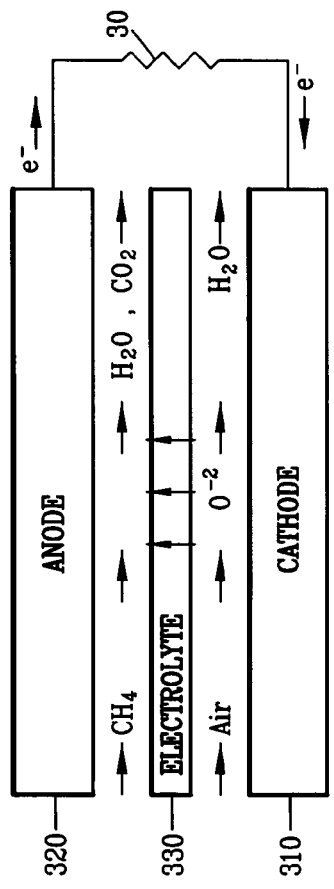
FIG. 16 is schematic diagram of a solid oxide fuel cell (SOFC)

FIG. 16 is schematic diagram of a solid oxide fuel cell (SOFC). The solid oxide fuel cell comprises a cathode 310, an anode 320 and an electrolyte 330. The solid oxide fuel cell (SOFC) converts hydrocarbon vapor and air (oxygen) in two water ($H_2O$), carbon dioxide ($CO_2$) and electrical power.

Figure 17:
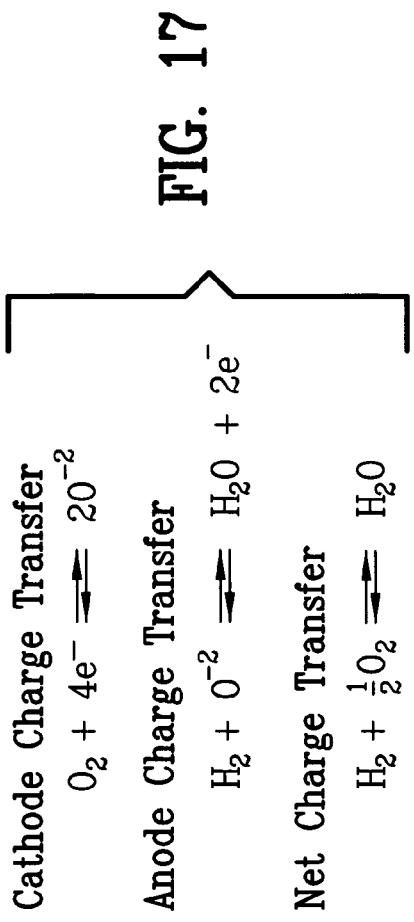
FIG. 17 is series of chemical equations illustrating the principle of operation of the solid oxide fuel cell (SOFC) of FIG. 16.

FIG. 17 is series of chemical equations illustrating the principle of operation of the solid oxide fuel cell (SOFC) of FIG. 16. The chemical equations show the transfer of charge to produce electrical power by the solid oxide fuel cell (SOFC).

For a more complete understanding of the operation of a solid oxide fuel cell (SOFC), the reader is directed to a paper presented at the International Symposium on Combustion in Jul. 29, 2004 entitled Solid-Oxide Fuel Cells (SOFC) With Hydrocarbon And Hydrocarbon-Derived Fuels. This paper was presented by by Robert J. Kee and Huayang Zhu of Engineering Division, Colorado School of Mines, Golden, Colo. 80401, USA and David G. Goodwin of Engineering and Applied Science, California Institute of Technology, Pasadena, Calif. 91125, USA and is incorporated by reference as a fully set forth herein.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An apparatus for recovering a hydrocarbon vapor emanating from a source, comprising:
    an input conduit having an input coupling for connecting to the source;
    a compressor having a compressor input and a compressor output for compressing the hydrocarbon vapor;
    an input manifold interconnecting said input conduit to said compressor input;
    an output manifold connected to said compressor output;
    a fuel cell for generating electrical power by processing the hydrocarbon vapor;
    an output conduit interconnecting said output manifold to said fuel cell for providing hydrocarbon vapor to fuel said fuel cell;
    an electrical connector for directing electrical power from said fuel cell to drive said compressor;
    a storage tank having a storage tank input and a storage tank liquid output;
    a second output conduit interconnecting said compressor output to said storage tank input for storing excess compressed vapor in said storage tank for subsequent use by said fuel cell; and
    a vaporizer interconnecting said storage tank liquid output to said fuel cell for vaporizing said hydrocarbon liquid into a hydrocarbon vapor for said fuel cell.

2. An apparatus for recovering a hydrocarbon vapor as set forth in claim 1, wherein the source comprises a vent from a mobile tank for transporting a hydrocarbon fluid.

3. An apparatus for recovering a hydrocarbon vapor as set forth in claim 1, wherein the source comprises a vent from a mobile tank for transporting a hydrocarbon liquid petroleum fuel product.

4. An apparatus for recovering a hydrocarbon vapor as set forth in claim 1, wherein the hydrocarbon vapor emanates from a vent of a tank during the filling of the tank with a hydrocarbon liquid.

5. An apparatus for recovering a hydrocarbon vapor as set forth in claim 1, wherein said input conduit includes a plurality of connection tubes for connecting said input coupling to multiple sources.

6. An apparatus for recovering a hydrocarbon vapor as set forth in claim 1, wherein said compressor comprises a plurality of compressors interconnected by said input and output manifolds between said input conduit and said fuel cell.

7. An apparatus for recovering a hydrocarbon vapor as set forth in claim 1, including a recycling conduit interconnecting said output manifold to said input manifold for recompressing hydrocarbon vapor emanating from said output manifold.

8. An apparatus for recovering a hydrocarbon vapor as set forth in claim 1, wherein said fuel cell includes plural fuel cells for generating electrical power by processing vapor.

9. An apparatus for recovering a hydrocarbon vapor as set forth in claim 1, wherein said electrical connector directs electrical power from said fuel cell to drive said compressor and for driving an external load.

10. An apparatus for recovering a hydrocarbon vapor emanating from a vent of a tank during the filling of the tank with a liquid, comprising:
    an input conduit having an input coupling for connecting to the vent of the tank for receiving hydrocarbon vapor emanating from a vent;
    a compressor having a compressor input and a compressor output;
    a storage tank having a storage tank input and a storage tank output;
    an input manifold interconnecting said input conduit to said compressor input for enabling said compressor to compress the hydrocarbon vapor;
    a fuel cell for generating electrical power;
    a first output conduit interconnecting said compressor output to said fuel cell for enabling said fuel cell to generate electrical power upon processing of the hydrocarbon vapor;
    a second output conduit interconnecting said compressor output to said storage tank input for storing compressed hydrocarbon vapor from said compressor output; and
    an electrical connector for directing electrical power from said fuel cell to power said compressor; and
    a vaporizer interconnecting said storage tank liquid output to said fuel cell for vaporizing said hydrocarbon liquid into a hydrocarbon vapor for said fuel cell.

11. A method of recovering a hydrocarbon vapor emanating from a vent of a tank during the filling of the tank with a liquid, comprising the steps of:
    connecting an input conduit to the vent of the tank for receiving hydrocarbon vapor emanating from the vent of the tank;

compressing the hydrocarbon vapor emanating from the vent of the tank into a compressed hydrocarbon vapor;

directing the compressed hydrocarbon vapor to a fuel cell for generating electrical power upon processing of the compressed hydrocarbon vapor; and directing electrical power from the fuel cell to power the compressor of the hydrocarbon vapor emanating from the vent of the tank.

12. An apparatus for recovering a hydrocarbon vapor emanating from vents of a plurality of tanks, comprising:

a plurality of input conduits for connecting to the vents of the plurality of tanks;

a plurality of compressors with each compressor having a compressor input and a compressor output for compressing the hydrocarbon vapor;

a storage tank having a storage tank input and a storage tank output;

an input manifold including a plurality of input manifold valves interconnecting said plurality of input conduits to said plurality of compressor inputs;

an output manifold including a plurality of output manifold valves connected to said plurality of compressor outputs;

a fuel cell for generating electrical power by processing hydrocarbon vapor;

a first output conduit interconnecting said compressor output to said fuel cell;

a second output conduit interconnecting said compressor output to said storage tank input;

an electrical connector for directing electrical power from said fuel cell to drive said compressor;

a control for controlling said plurality of input manifold valves and said plurality of output manifold valves for providing a compressed vapor to power said fuel cell and for storing excess compressed vapor in said storage tank for subsequent use by said fuel cell; and a vaporizer interconnecting said storage tank liquid output to said fuel cell for vaporizing said hydrocarbon liquid into a hydrocarbon vapor for said fuel cell.

13. An apparatus for recovering a hydrocarbon vapor emanating from vents of a plurality of tanks, comprising:

a plurality of input conduits for connecting to the vents of the plurality of tanks;

a plurality of compressors with each compressor having a compressor input and a compressor output for compressing the hydrocarbon vapor;

a storage tank having a storage tank input and a storage tank output;

an input and an output manifold including a plurality of input and output manifold valves interconnecting said plurality of input conduits to said plurality of compressor inputs and said plurality of compressor outputs and said storage tank input;

a fuel cell for processing a hydrocarbon vapor to generate electrical power;

a first output conduit interconnecting said compressor output to said fuel cell;

a second output conduit interconnecting said compressor output to said storage tank input;

a storage tank output conduit interconnecting said storage tank output to said fuel cell;

an electrical connector for directing electrical power from said fuel cell to drive said compressor;

a control controlling said plurality of input manifold valves and said plurality of output manifold valves into a first position whereat compressed hydrocarbon vapors are directed from at least one of said plurality of compressors to said fuel cell;

said control controlling said plurality of input manifold valves and said plurality of output manifold valves into a second position whereat compressed hydrocarbon vapors are directed from at least one of said plurality of compressors to said storage tank;

said control controlling said plurality of input manifold valves and said plurality of output manifold valves into a third position whereat compressed hydrocarbon vapor are directed from said storage tank to said fuel cell; and a vaporizer interconnecting said storage tank liquid output to said fuel cell for vaporizing said hydrocarbon liquid into a hydrocarbon vapor for said fuel cell.

14. An apparatus for recovering a hydrocarbon vapor emanating from vents of a plurality of tanks, comprising:

a plurality of input conduits for connecting to the vents of the plurality of tanks;

a plurality of compressors for compressing the hydrocarbon vapor;

a storage tank;

a fuel cell for processing a hydrocarbon vapor to generate electrical power;

an input and an output manifold including a plurality of input and output manifold valves interconnecting said plurality of input conduits and said plurality of compressors and said storage tank input and said fuel cell;

an electrical connector for directing electrical power from said fuel cell to drive said plurality of compressors;

a control controlling said plurality of input and output manifold valves into a first position whereat compressed hydrocarbon vapors are directed from at least one of said plurality of compressors to said fuel cell;

said control controlling said plurality of input and output manifold valves into a second position whereat compressed hydrocarbon vapors are directed from said at least one of said plurality of compressors to said storage tank; and said control controlling said plurality of input and output manifold valves into a third position whereat compressed hydrocarbon vapors are directed from said storage tank to said fuel cell; and a vaporizer interconnecting said storage tank liquid output to said fuel cell for vaporizing said hydrocarbon liquid into a hydrocarbon vapor for said fuel cell.

15. A method of recovering a hydrocarbon vapor emanating from a vent of a tank during the filling of the tank with a liquid, comprising the steps of:

connecting an input conduit to the vent of the tank for receiving hydrocarbon vapor emanating from a vent of a tank;

compressing the hydrocarbon vapor emanating from the vent of the tank into a compressed hydrocarbon vapor;

directing the compressed hydrocarbon vapor to a fuel cell for generating electrical power upon processing of the compressed hydrocarbon vapor;

directing electrical power from the fuel cell to power the compressor of the hydrocarbon vapor emanating from the vent of the tank; and directing excess compressed hydrocarbon vapor into a storage tank.

* * * * *